(12) United States Patent
Kim et al.

(10) Patent No.: US 11,493,679 B2
(45) Date of Patent: Nov. 8, 2022

(54) BACKLIGHT UNIT AND DISPLAY DEVICE INCLUDING THE SAME

(71) Applicant: Samsung Display Co., Ltd., Yongin-si (KR)

(72) Inventors: Hyun Hyang Kim, Suwon-si (KR); Hyun Jeong Kim, Hwaseong-si (KR); Ji Eun Nam, Seoul (KR); Young Keun Lee, Suwon-si (KR); Hyeon Mi Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 48 days.

(21) Appl. No.: 17/109,117

(22) Filed: Dec. 1, 2020

(65) Prior Publication Data

US 2021/0255380 A1 Aug. 19, 2021

(30) Foreign Application Priority Data

Feb. 13, 2020 (KR) .................. 10-2020-0017613

(51) Int. Cl.
*F21V 8/00* (2006.01)

(52) U.S. Cl.
CPC .......... *G02B 6/0023* (2013.01); *G02B 6/0068* (2013.01)

(58) Field of Classification Search
CPC .......................... G02B 6/0023; G02B 6/0068
See application file for complete search history.

(56) References Cited

U.S. PATENT DOCUMENTS

| 9,971,079 B2 | 5/2018 | Dong et al. | |
| 10,007,054 B2 * | 6/2018 | Kim | G02B 6/0073 |
| 2015/0369993 A1 * | 12/2015 | Kim | G02B 6/0091 |
| | | | 362/610 |

FOREIGN PATENT DOCUMENTS

| CN | 104235683 A | * 12/2014 | .......... G02B 6/0026 |
| JP | 2012-220689 | 11/2012 | |
| KR | 10-0780193 | 11/2007 | |
| KR | 2014-0023315 | 2/2014 | |
| KR | 10-1572165 | 11/2015 | |
| WO | WO-2014171394 A1 | * 10/2014 | ............... G02B 6/00 |

* cited by examiner

*Primary Examiner* — Mary Ellen Bowman
(74) *Attorney, Agent, or Firm* — H.C. Park & Associates, PLC

(57) ABSTRACT

A backlight unit for a display device includes: a light guide including a light incident surface; a substrate facing the light incident surface; a plurality of light sources on one surface of the substrate facing the light incident surface; and a first member disposed between the substrate and the light incident surface to space the light sources apart from the light guide. The first member includes: a support on one surface of the substrate that do not include the light source, the support having a first surface facing the light incident surface and a second surface facing the light sources; and a first layer disposed on the first surface and the second surface of the support to improve luminance uniformity across the light incident surface.

20 Claims, 17 Drawing Sheets

FIG. 10
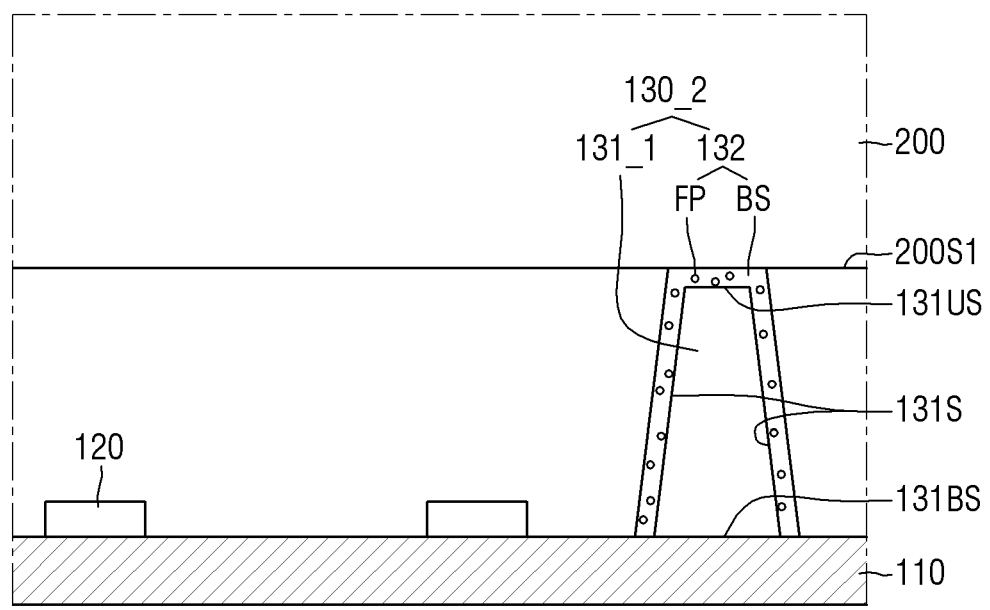
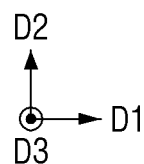

FIG. 12
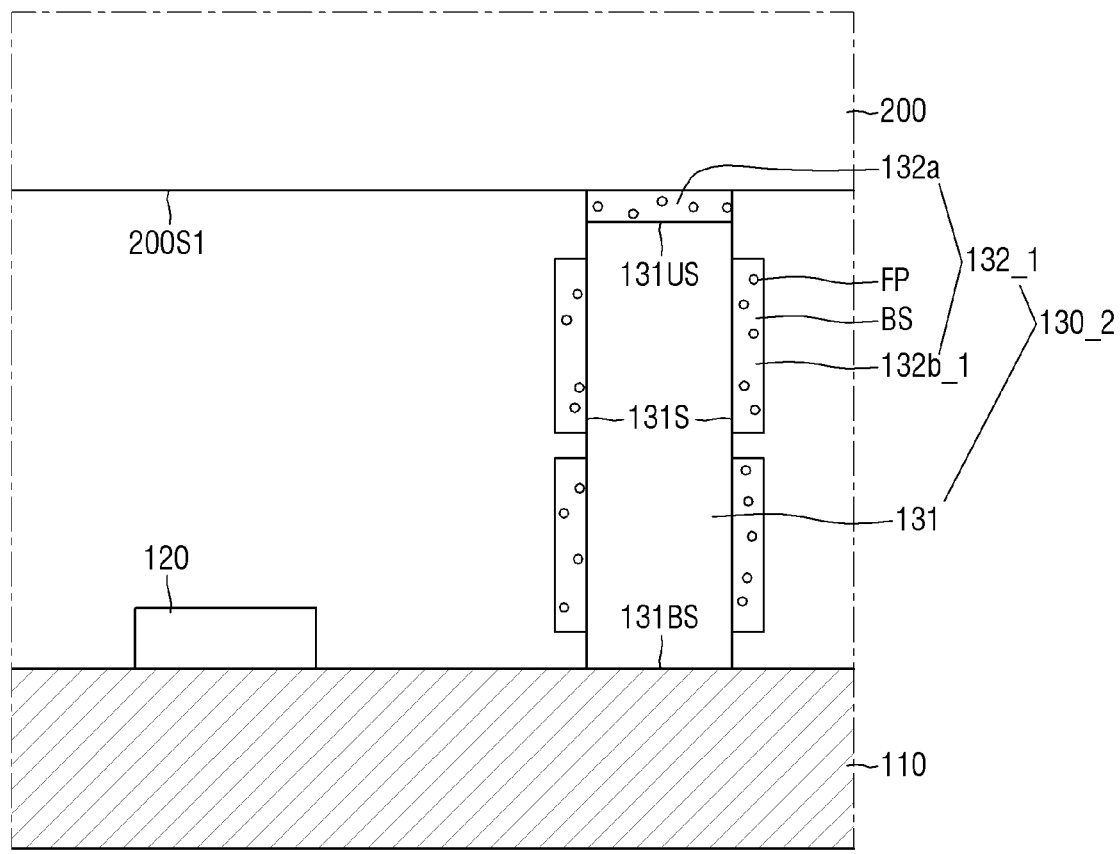
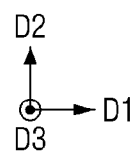

FIG. 14
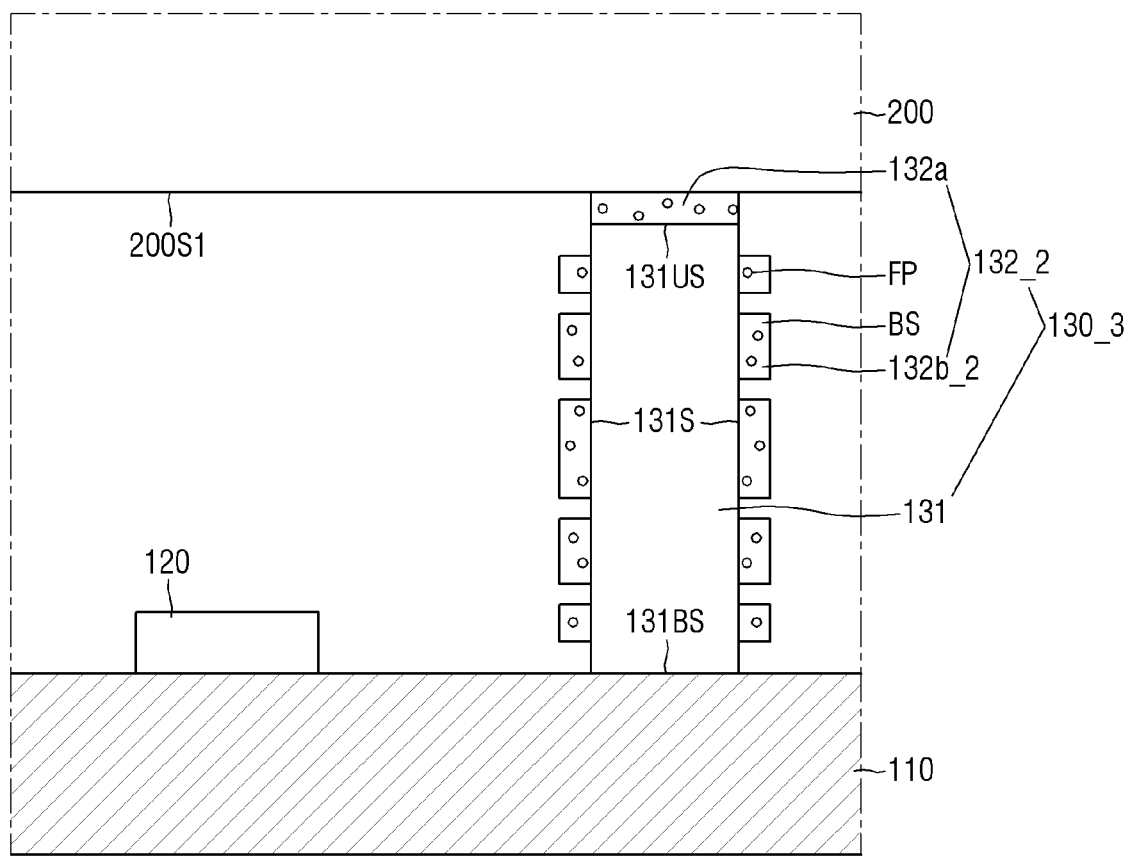
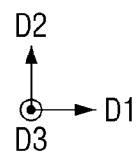

BACKLIGHT UNIT AND DISPLAY DEVICE INCLUDING THE SAME

CROSS REFERENCE TO RELATED APPLICATION

This application claims priority from and the benefit of Korean Patent Application No. 10-2020-0017613, filed on Feb. 13, 2020, which is hereby incorporated by reference for all purposes as if fully set forth herein.

BACKGROUND

Field

Exemplary implementations of the invention relate generally to backlight unit for a display device and more specifically, to a backlight unit for a display device that provides more uniform luminance.

Discussion of the Background

A liquid crystal display device receives light from a backlight unit and displays an image. The backlight unit includes a light source and a light guide plate. The light guide plate receives light from the light source and guides the light-emitting direction of the light travelling toward the display panel.

In order to prevent the light guide plate from being damaged by heat generated from the light source and to sufficiently secure or retain an incident area in which light emitted from the light source enters the light guide plate, the backlight unit may further include a spacer supporting the light guide plate to maintain a certain distance between the light source and the light guide plate. Recently, research has been conducted to improve luminance uniformity between an area in which a spacer is disposed and an area in which a spacer is not disposed.

The above information disclosed in this Background section is only for understanding of the background of the inventive concepts, and, therefore, it may contain information that does not constitute prior art.

SUMMARY

Applicant discovered that spacers for maintaining a certain distance between a light source and a light guide plate in a backlight unit block light from the light source, resulting in dark portions and irregular luminance.

Backlight units and display devices including the same constructed according to the principles and some exemplary implementations of the invention are capable of preventing the light guide plate from being damaged by heat generated from the light source, e.g., by providing spacers to maintain a predetermined distance between the light source and the light guide plate.

Backlight units and display devices constructed according to the principles and some exemplary implementations of the invention are capable of preventing or reducing dark portions cause by the spacers, e.g., by providing a light regulating material layer on the outer surface of the spacer. Thus, the backlight unit may have improved luminance uniformity. For example, a spacer may support a light guide plate to maintain the spacing between a light source and the light guide plate, and may include a support and a light regulating material layer facing the light guide plate to reduce the difference in luminance between an area where the spacer is disposed and an area where the spacer is not disposed, thereby improving luminance uniformity.

Further, the spacer may further include a light regulating material layer disposed on the side surface of the support facing the light source to improve differences in color between the area where the spacer is located and the area where the space is not disposed.

Further, the light regulating material layer may include wavelength conversion particles and a binder layer. The light regulating material layer may adjust viscosity and hardness using the binder layer, and the binder layer may protect the wavelength conversion particles included in the light regulating material layer facing the light guide plate to prevent the wavelength conversion particles from being damaged by the load of the light guide plate.

Additional features of the inventive concepts will be set forth in the description which follows, and in part will be apparent from the description, or may be learned by practice of the inventive concepts.

According to one aspect of the invention, a backlight unit for a display device includes a light guide including a light incident surface; a substrate facing the light incident surface; a plurality of light sources on one surface of the substrate facing the light incident surface; and a first member disposed between the substrate and the light incident surface to space the light sources apart from the light guide, wherein the first member includes: a support on one surface of the substrate that do not include the light source, the support having a first surface facing the light incident surface and a second surface facing the light sources; and a first layer disposed on the first surface and the second surface of the support to improve luminance uniformity across the light incident surface.

The first member may include a spacer having a height greater than a height of the light sources.

The height of the spacer may be substantially equal to a sum of a height of the support and a thickness of the first layer, and the height of the support may be greater than the height of the light sources and the thickness of the first layer.

Light emitted from each of the light sources may have a light path within a range of a light-emitting angle of each of the light sources, the range of the light-emitting angle of each of the light sources defined by a reference path line of the light path having a maximum angle from a reference line vertically passing through a center of each of the light sources adjacent to the first member, the reference path line passing through the second surface of the support.

Each of the light sources may be configured to emit light having a first wavelength band, the first layer may include a light regulating material layer including a binder layer and wavelength conversion particles disposed in the binder layer, and the wavelength conversion particles may be configured to convert the light having the first wavelength band into light having a second wavelength band different from the first wavelength band.

The light having the first wavelength band may be blue light, and the wavelength conversion particles may be configured to convert the blue light into yellow light.

The wavelength conversion particles may include a yellow fluorescent material.

The binder layer may include silicon.

The first layer may include a first region disposed on the first surface of the support and a second region disposed on the second surface of the support.

The first region may completely cover the first surface of the support.

The second region may be patterned to form a plurality of patterned second regions disposed on the second surface of the support.

Each patterned second region may have width that decreases in a direction toward the light incident surface.

The second region may substantially completely cover the second surface of the support.

The first region may be patterned and disposed on the first surface of the support.

The light guide may include a light guide plate and the second region is in contact with the light incident surface of the light guide plate.

The plurality of light sources may be spaced apart from each other, and the first member and the light sources adjacent thereto may be spaced apart from each other.

According to another aspect of the invention, a display device includes: a backlight unit including a light guide having a light incident surface, a substrate facing the light incident surface, a plurality of light sources on one surface of the substrate facing the light incident surface to emit light, and a first member disposed between the substrate and the light incident surface to space the light sources apart from the light guide; and a display panel disposed on the backlight unit, wherein the first member includes: a support disposed on one surface of the substrate that does not contain the light sources, the support having a first surface facing the light incident surface and a second surface facing the light sources; and a first layer disposed on the first surface and second surface of the support to improve luminance uniformity across the light incident surface.

The first layer may include a first region disposed on the first surface of the support and a second region disposed on the second surface of the support.

The second region of the first layer may be in contact with the light incident surface of the light guide.

The light may be blue light, and the first layer may include a light regulating material layer having a binder layer and wavelength conversion particles dispersed in the binder layer, and the wavelength conversion particles may include a fluorescent material to convert the blue light into yellow light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 10 is an enlarged cross-sectional view illustrating another exemplary embodiment of the spacer of the light source member of FIG. 6.

FIG. 12 is an enlarged cross-sectional view illustrating the spacer of the light source member of FIG. 11.

FIG. 14 is an enlarged cross-sectional view illustrating the spacer of FIG. 13.

DETAILED DESCRIPTION

Figure 1:
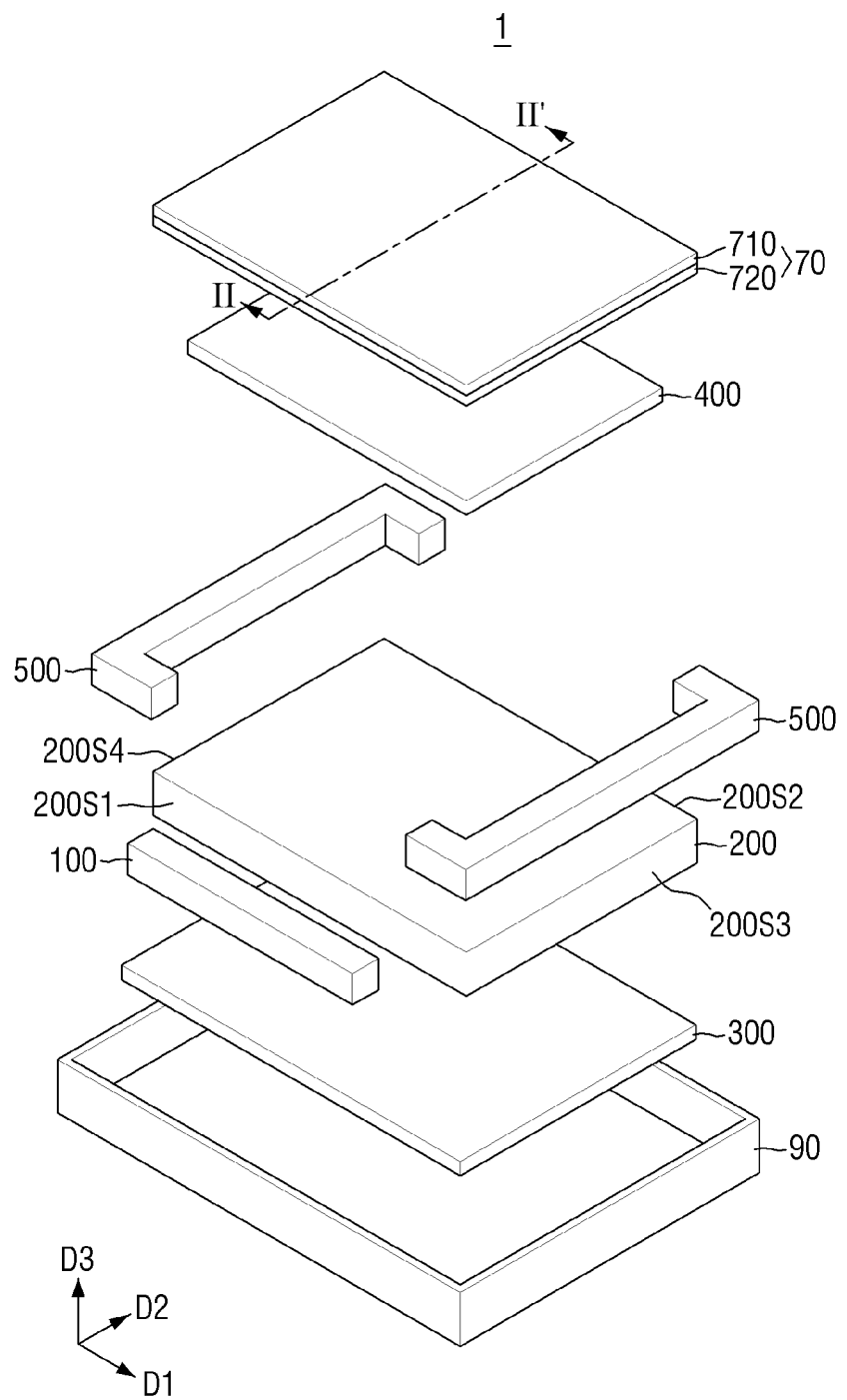
FIG. 1 is an exploded perspective view of an exemplary embodiment of a display device constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the invention will be described with reference to the attached drawings.

Figure 2:
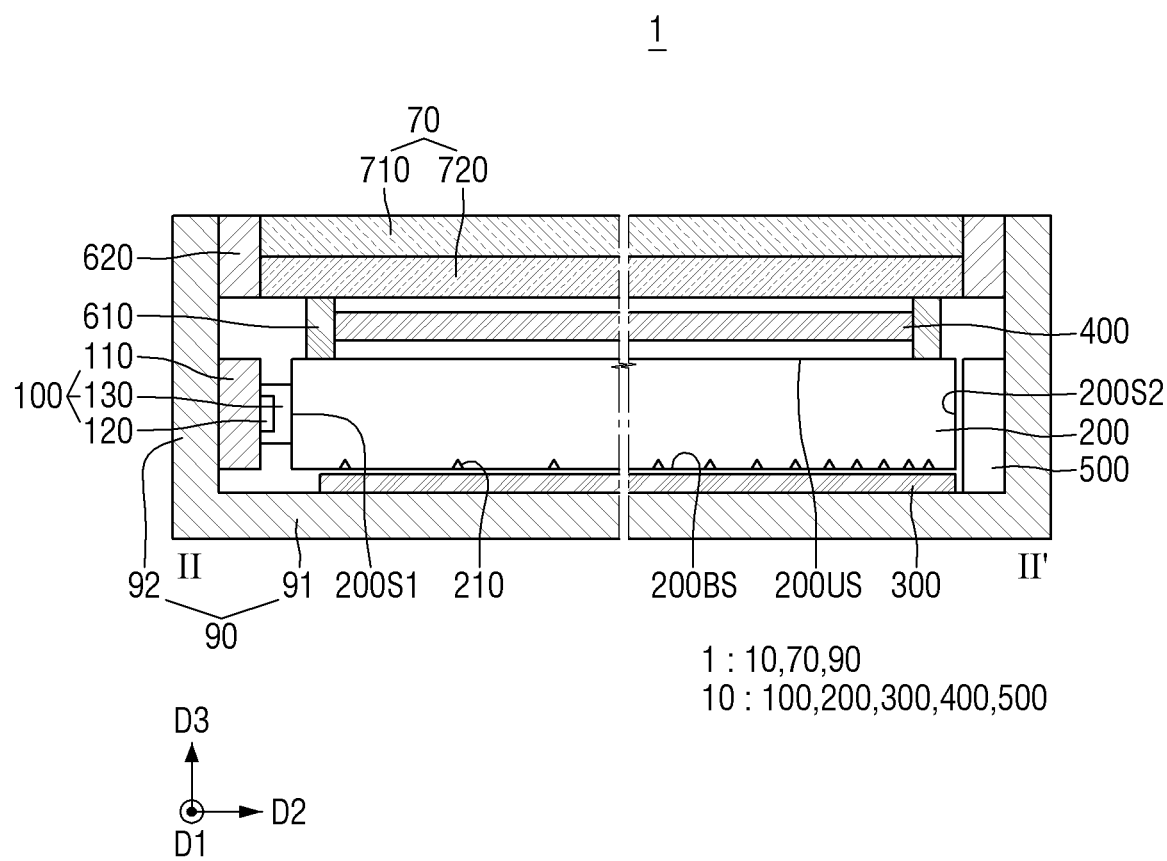
FIG. 2 is a cross-sectional view taken along the line II-II' of FIG. 1.

FIG. 1 is an exploded perspective view of an exemplary embodiment of a display device constructed according to the invention, and FIG. 2 is a cross-sectional view taken along the line II-II' of FIG. 1.

Referring to FIGS. 1 and 2, a display device 1 may include any electronic device that includes a display screen. For example, the display device 1 may include televisions, notebooks, monitors, billboards, mobile phones, smart phones, tablet personal computers (tablet PCs), electronic watches, smart watches, watch phones, mobile communication terminals, electronic notebooks, electronic books, portable multimedia players (PMPs), navigators, game machines, digital cameras, and internet of things (IOTs), each of which has a display screen.

In the drawings, the first direction D1, the second direction D2, and the third direction D3 are defined. The first direction D1 and the second direction D2 may be directions substantially perpendicular to each other in one plane. The third direction D3 may be a direction substantially perpendicular to a plane in which the first direction D1 and the second direction D2 are located. The third direction D3 is substantially perpendicular to each of the first direction D1 and the second direction D2. In the following exemplary embodiments, the third direction D3 refers to a display direction of the display device 1.

The display device 1 may have a generally rectangular shape in a plan view (i.e., when viewed in plane), but the shape thereof is not limited thereto. The display device 1 may have a generally rectangular shape with a width in the second direction D2 and a length in the first direction D1, which is longer than the width. The display surface of the display device 1 may face the third direction D3.

In exemplary embodiments, unless otherwise stated, the "upper portion" refers to a display direction as the third direction D3, and, similarly, the "upper surface" refers to a surface facing the third direction D3. Further, the "lower portion" refers to an opposite direction of the display direction as the opposite direction of the third direction D3, and similarly, the "lower surface" refers to a surface facing the opposite direction of the third direction D3. Further, the "left", "right", "up", and "down" refer to directions when the display device 1 is viewed in plan. For example, the "left" refers to the opposite direction of the first direction D1, the "right" refers to the first direction D1, the "up" refers to the second direction D2, and the "down" refers to the opposite direction of the second direction DR2.

The display device 1 may include a display panel 70, a backlight unit 10 disposed under the display panel 70 to provide light to the display panel 70, and a housing 90 accommodating the display panel 70 and the backlight unit 10.

The display panel 70 may receive light emitted from the backlight unit 10 to display an image. The display panel 70 may be a light-receiving display panel, such as a liquid crystal display panel, an electrowetting display panel, an electrophoretic display panel, or other known types of display panels. Hereinafter, a case where the display panel 70 is a liquid crystal panel (LCD) will be described as an example. However, exemplary embodiments are not limited thereto. For example, when the display panel 70 is a different type of display panel, the following description may be applied in the similar way.

The display panel 70 includes a plurality of pixels. The pixels of the display panel 70 may be arranged in a matrix form. The display panel 70 may include a switching element such as a transistor for each pixel, a pixel electrode, and a common electrode facing the pixel electrode.

The display panel 70 may include an upper substrate 710 and a lower substrate 720 facing the upper substrate 710. The switching element and the pixel electrode may be disposed on the lower substrate 720, and the common electrode may be disposed on the lower substrate 720 or the upper substrate 710. The display panel 70 may further include a liquid crystal layer disposed between the upper substrate 710 and the lower substrate 720. A sealing member 620 is disposed at the edges of the upper substrate 710 and the lower substrate 720 to retain liquid crystal molecules of the liquid crystal layer.

The backlight unit 10 may provide light to the display panel 70. The backlight unit 10 may overlap the display panel 70 in the third direction D3 and be disposed under the display panel 70.

The backlight unit 10 may include a light source member 100, a light guide, which may be in the form of a light guide plate 200, a reflective member 300, and an optical member 400. The backlight unit 10 may further include a middle mold 500.

Referring to FIG. 2, the light source member 100 may include a first substrate 110, and a plurality of light sources 120 and a plurality of spacers 130 on the first substrate 110. The light source 120 emits light to the display panel 70. The light emitted from the light source 120 may be incident on the light guide plate 200.

The light guide plate 200 may guide the light from the light source 120 of the light source member 100 toward the display panel 70. The light guide plate 200 may have a substantially polygonal column shape. The planar shape of the light guide plate 200 may be substantially same as the planar shape of the display device 1. In an exemplary embodiment, when the planar shape of the display device 1 is a generally rectangular shape with a width in the second direction D2 and a length in the first direction D1, which is longer than the width, the planar shape of the light guide plate 200 may also have a generally rectangular shape with a width in the second direction D2 and a length in the first direction D1, which is longer than the width.

Figure 3:
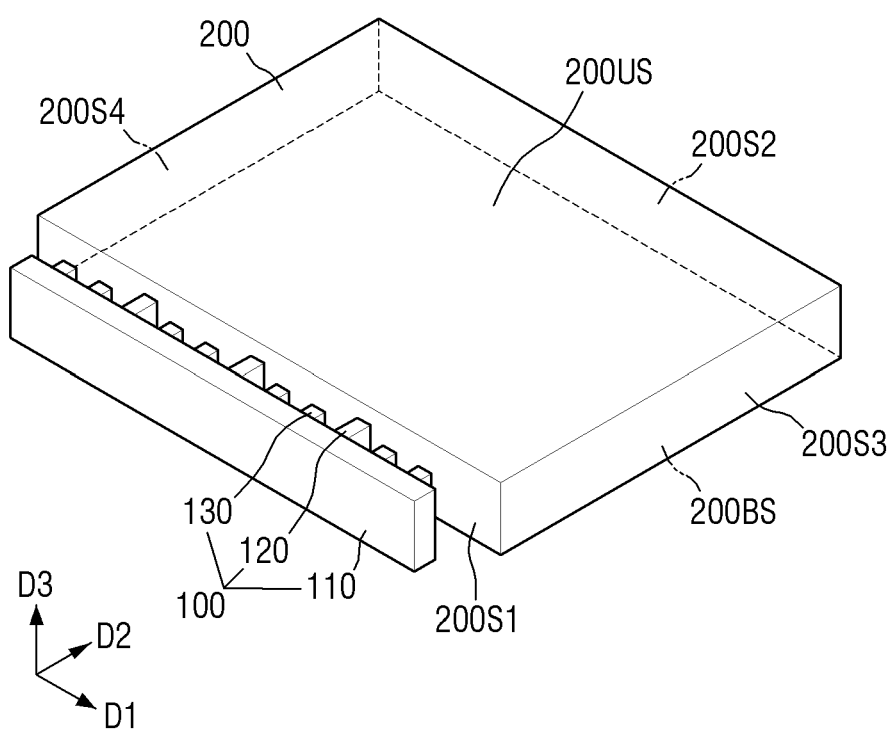
FIG. 3 is a perspective view illustrating the positional relationship between a light source member and a light guide plate of FIG. 1.

Referring to FIGS. 2 and 3, in an exemplary embodiment, the light guide plate 200 may be a generally hexagonal column having a generally rectangular planar shape. The light guide plate 200 may include an upper surface 200US, a lower surface 200BS, and four side surfaces 200S. The four side surfaces 200S of the light guide plate 200 may include a first side 200S1, a second side 200S2, a third side 200S3, and a fourth side 200S4.

The light guide plate 200 may further include light output pattern 210. The light output pattern 210 may be disposed on the lower surface 200B S of the light guide plate 200. The light output pattern 210 may enhance light output by minimizing the loss of light provided from the light source member 100. Specifically, the light output pattern 210 may change the travel direction of light guided inside the light guide plate 200 to an upper portion where the display panel 70 is located.

In an exemplary embodiment, the light output pattern 210 may be formed on the surface of the light guide plate 200. For example, a concave groove may be formed on the lower surface 200BS of the light guide plate 200 to function as the light output pattern 210. However, exemplary embodiments are not limited thereto. For example, the light output pattern 210 may be formed in a separate layer or pattern. For example, the light output pattern 210 may be a pattern layer including a protrusion pattern and/or a recess, e.g., concave groove, pattern, or a printing pattern may be formed to function as the light output pattern 210.

Referring to FIG. 2, the distribution density of the light output pattern 210 may be changed or varied according to areas of the light guide plate 200. For example, an area adjacent to the first side surface (e.g., light incident surface, 200S1) having a relatively large amount of traveling light may have a lower distribution density. For example, an area adjacent to the second side surface (e.g., light facing surface, 200S2) having a relatively small amount of traveling light may have a higher distribution density.

Details of the light source member 100 and the light guide plate 200 will be described later.

The middle mold 500 may be disposed adjacent to the third side surface 200S3 and the fourth side surface 200S4 of the light guide plate 200. The middle mold 500 may surround the third side surface 200S3 and the fourth side surface 200S4 of the light guide plate 200. The middle mold 500 may extend in the second direction D2 and bend toward the first side surface 200S1 and the second side surface 200S2 of the light guide plate 200, respectively, and may thus have a substantially "U" shape. For example, the middle mold 500 may partially cover the first side surface 200S1 and the second side surface 200S2 of the light guide plate 200.

The middle mold 500 may support the light guide plate 200. The middle mold 500 may support the first side surface 200S1 of the light guide plate 200 in the second direction D2. The middle mold 500 may support the first side surface 200S1 of the light guide plate 200 in the second direction D2 such that the light source 120 of the light source member 100 is protected from being damaged by the load of the light guide plate 200. The middle mold 500 may also fix the light guide plate 200.

The reflective member 300 may be disposed under the light guide plate 200. The reflective member 300 may be disposed under the light guide plate 200 to reflect light incident on the reflective member 300 such that the reflected light is transmitted toward the display panel 70. For example, the reflective member 300 may re-transmit light leaked downward from the light guide plate 200, toward the light guide plate 200 disposed thereon. Thus, the reflective member 600 may improve the light emission efficiency of the display device 1 by increasing the amount of the light provided from the light source member 100 to the display panel 70, and may improve the luminance and display quality of the display device 1.

The reflective member 300 may include a reflective film or a reflective coating layer. The reflective member 300 may include a reflective material. The reflective member 300 may be made of a metal-containing material such as silver (Ag), copper (Cu), aluminum (Al), nickel (Ni), lanthanum (La), an alloy thereof, indium tin oxide (ITO), indium zinc oxide (IZO), or indium-tin-zinc oxide (ITZO), but exemplary embodiments are not limited thereto.

Referring to FIG. 2, the optical member 400 may be disposed on the light guide plate 200. The optical member 400 may be accommodated in a space surrounded by an optical coupling member 610 between the light guide plate 200 and the display panel 70. The optical member 400 may be in contact with the inner surface of the optical coupling member 610 and be attached thereto. Although the drawings show that the optical member 400 and the light guide plate 200 are spaced apart from each other and the optical member 400 and the display panel 70 are spaced apart from each other, exemplary embodiments are not limited thereto. For example, the space between the optical member 400 and the light guide plate 200 and the space between the optical member 400 and the display panel 70 may be omitted.

The optical member 400 may control the path and/or polarization characteristics of light traveling from the light guide plate 200 toward the display panel 70. The optical member 400 may include at least one optical sheet. For example, the optical sheet may include a prism sheet, a micro lens, a lenticular sheet, a diffusion sheet, a polarizing sheet, a reflective polarizing sheet, a retardation sheet, and a protective sheet.

The housing 90 may have one surface opening, a bottom surface 91 and sidewalls 92 connected to the bottom surface 91. The housing 90 may accommodate the backlight unit 10 and the display panel 70 in a space defined by the bottom surface 91 and the sidewalls 92. The housing 90 may include a bottom chassis or a bracket. For example, the housing 90 may further include a top chassis including the one surface opening.

The reflective member 600, the light guide plate 200, the optical member 400, and the display panel 70 of the backlight unit 10 may be sequentially arranged or stacked in the third direction D3 from the bottom surface 91 of the housing 90. The light source member 100 of the backlight unit 10 may be fixed to the sidewalls 92 of the housing 90 through a separate coupling member. However, exemplary embodiments are not limited thereto, and the light source member 100 may be mounted on another seating structure and disposed adjacent to one side surface of the light guide plate 200.

Figure 4:
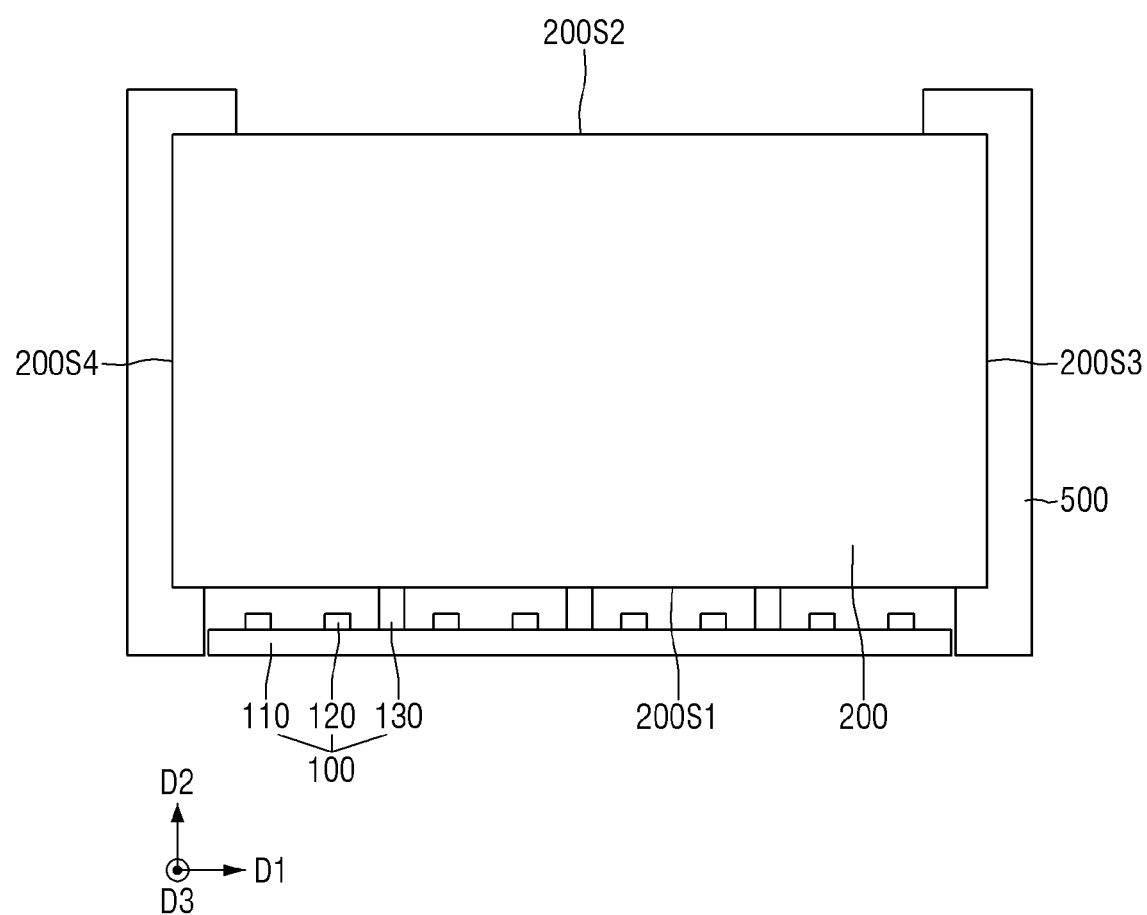
FIG. 4 is a plan view illustrating the positional relationship of the light source member, the light guide plate, and a middle mold of FIG. 1.
Figure 5:
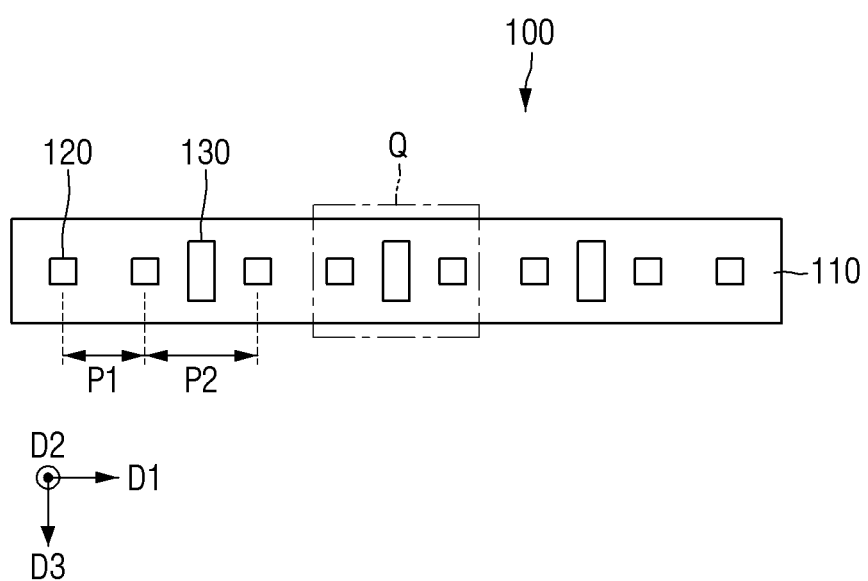
FIG. 5 is a plan view of the light source member of FIG. 1.

FIG. 3 is a perspective view illustrating the positional relationship between a light source member and a light guide plate of FIG. 1, FIG. 4 is a plan view illustrating the positional relationship of the light source member, the light guide plate, and a middle mold of FIG. 1, and FIG. 5 is a plan view of the light source member of FIG. 1.

Referring to FIGS. 3 and 4, as described above, the light guide plate 200 may include the upper surface 200US, the lower surface 200BS, and the four side surfaces 200S.

Each of the upper surface 200US and the lower surface 200BS of the light guide plate 200 is located substantially in one plane, and the plane where the upper surface 200US of the light guide plate 200 is located and the plane where the lower surface 200BS of the light guide plate 200 is located are substantially parallel to each other, so that the light guide plate 200 may have a substantially uniform thickness as a whole. However, exemplary embodiments are not limited thereto. For example, the upper surface 200US or the lower surface 200BS of the light guide plate 200 is formed on a plurality of planes, or the plane where the upper surface 200US of the light guide plate 200 is located and the plane where the lower surface 200BS of the light guide plate 200 is located may intersect each other.

The plane where the upper surface 200US and/or the lower surface 200BS of the light guide plate 200 is located may form an angle of about 90° with the plane where each side surface 200S of the light guide plate 200 is located. However, exemplary embodiments are not limited thereto. For example, the light guide plate 200 may further include an inclined surface between the upper surface 200US and one side surface 200S and/or between the lower surface 200BS and one side surface 200S.

The four side surfaces 200S of the light guide plate 200 may include the first side surface 200S1, the second side surface 200S2, the third side surface 200S3, and the fourth side surface 200S4.

Referring to FIG. 4, the first side surface 200S1 of the light guide plate 200 may face the light source member 100. The first side surface 200S1 of the light guide plate 200 may be a lower side surface corresponding to the lower side in a plan view (based on the third direction D3) when viewed in the third direction D3.

The second side surface 200S2 of the light guide plate 200 may be a surface facing the first side surface 200S1. The second side surface 200S2 of the light guide plate 200 may face the first side surface 200S1 in the second direction D2. The second side surface 200S2 of the light guide plate 200 may be an upper side surface corresponding to the upper side in a plan view (based on the third direction D3) when viewed in the third direction D3.

The third side surface 200S3 of the light guide plate 200 may be a surface facing the first direction D1. The third side surface 200S3 of the light guide plate 200 may be a right side surface corresponding to the right side in a plan view (based on the third direction D3) when viewed in the third direction D3.

The fourth side surface 200S4 of the light guide plate 200 may be a surface facing the third side surface 200S3. The fourth side surface 200S4 of the light guide plate 200 may be a left side surface corresponding to the left side in a plan view (based on the third direction D3) when viewed in the third direction D3.

The material of the light guide plate 200 is not limited to a particular material as long as the material has a high light transmittance and a high refractive index to minimize the loss of light provided from the light source member 100 and guide the light. For example, the light guide plate 200 may be made of a polymer material such as polycarbonate, polysulfone, polyacrylate, polystyrene, polyvinyl alcohol, polyvinylchloride, or polyester, or may be made of a glass material.

The light source member 100 may be disposed adjacent to at least one side surface 200S of the light guide plate 200. Although the drawings show that the light source member 100 is disposed adjacent to the first side surface 200S1 located at one long side of the light guide plate 200, exemplary embodiments are not limited thereto. For example, the plurality of light source members 100 may be disposed adjacent to all of the first and second side surfaces 200S1 and 200S2 of both long sides of the light guide plate 200, or may be disposed adjacent to the third and fourth side surfaces 200S3 and 200S4 adjacent to one short side or both short sides of the light guide plate 200.

Hereinafter, the side surface of one long side of the light guide plate 200 disposed adjacent to the light source member 100 and facing the light source member 100, i.e., the first side surface 200S1 refers to a light incident surface (indicated as '200S1' for convenience of description in the drawings), and the side surface of the other long side of the light guide plate 200 facing the one long side thereof refers to a light facing surface (indicated as '200S2' for convenience of description in the drawings).

Hereinafter, the first substrate 110, the light source 120, and the spacer 130 of the light source member 100 will be described in detail with reference to FIG. 5.

The light source member 100 may include a first substrate 110, a plurality of light sources 120 disposed on the first substrate 110, and a spacer 130 disposed on the first substrate 110.

The first substrate 110 may provide a space in which the light source 120 is disposed. The first substrate 110 may be a circuit board. When the first substrate 110 is a circuit board, the first substrate 110 may be implemented as a printed circuit board (PCB). When the first substrate 110 is implemented as the printed circuit board, the plurality of light sources 120 mounted on the first substrate 110 may be electrically connected to each other. However, exemplary embodiments are not limited thereto. For example, the first substrate 110 may be an insulating substrate. When the first substrate 110 is an insulating substrate, the first substrate 110 may be made of a transparent material such as glass or quartz, or may be made of a polymer material such as polyimide. When the first substrate 110 is an insulating substrate, the light source member 100 may further include a circuit element layer that drives the light source 120. The circuit element layer may be formed on one surface of the insulating substrate, and may be formed as a printed circuit board to be attached or fixed to one surface of the insulating substrate. Hereinafter, a case where the first substrate 110 is a liquid crystal printed circuit board (PCB) will be described as an example below. However, even when the first substrate 110 is a different type of substrate, the following description may be applied in the similar way.

The first substrate 110 may have an elongate shape extending in one direction. For example, the first substrate 110 may have an elongate shape extending in the first direction D1. Specifically, when viewed in the second direction D2, the first substrate 110 may have a generally rectangular shape with a width in the third direction D3 and a length in the first direction D1, which is longer than the width.

The first substrate 110 may be disposed adjacent to the light incident surface 200S1 of the light guide plate 200. The first substrate 110 may overlap the light guide plate 200 in the second direction D2. The first substrate 110 may be spaced apart from the light incident surface 200S1 of the light guide plate 200 in the second direction D2.

The length of the first substrate 110 in the first direction D1 may be shorter than the length of the light guide plate 200 in the first direction D1.

The plurality of light sources 120 may be disposed on one surface of the first substrate 110. The one surface of the first substrate 110, on which the plurality of light sources 120 are disposed, may be a surface facing the light incident surface 200S1 of the light guide plate 200. The one surface of the first substrate 110 and the light incident surface 200S1 of the light guide plate 200 may be substantially parallel to each other.

The light source 120 may be a point light source. The light source 120 may be provided in a package form. In an exemplary embodiment, the light source 120 may be a light emitting diode (LED) package, but exemplary embodiments are not limited thereto.

The light source 120 may emit light of a specific wavelength band. For example, the light source 120 may emit blue light with a wavelength band of 420 nm to 470 nm. In some exemplary embodiments, the light source 120 may emit light with two or more peak wavelengths. For example, the light source 120 may emit light with a near ultraviolet wavelength and blue light. Hereinafter, a case where light emitted from the light source 120 is blue light with a wavelength band of 420 nm to 470 nm will be described as below. For example, when the wavelength band of the light emitted from the light source 120 is changed or varied, the following description may be applied in the similar way.

The light emitted from the light source 120 may be incident on the light guide plate 200. The light may be emitted from the light source 120 toward the light guide plate 200 through one surface of the light source 120. The one surface of the light source 120 may be a surface facing the light incident surface 200S1 of the light guide plate 200. In an exemplary embodiment, referring to FIG. 4, the light source 120 may emit light through the upper surface of the light source 120 (e.g., in the second direction D2).

The light source 120 may be spaced apart from the light guide plate 200 in the second direction D2. Specifically, referring to FIG. 4, the upper surface of the light source 120 and the light incident surface 200S1 of the light guide plate 200 may be spaced apart from each other in the second direction D2. The light source 120 may be spaced apart from the light guide plate 200 in the second direction D2 to secure or retain a sufficient space such that the light emitted from the light source 120 is prevented from being condensed only in a part of the light incident surface 200S1 of the light guide plate 200, and the light guide plate 200 is protected from being damaged by heat generated from the light source 120.

The plurality of light sources 120 may be spaced apart from each other. The light sources 120 may be spaced apart from each other along one direction, e.g., in an extension direction of the first substrate 110. For example, the light sources 120 may be arranged by predetermined intervals along the first direction D1.

The distance between the light sources 120 may be substantially the same to prevent the occurrence of bright and dark portions. However, in the two light sources 120 adjacent to each other in the first direction D1, the second distance P2 between the two light sources 120 having the spacer 130 therebetween may be different from the first distance P1 between the two light sources 120 having no spacer 130 therebetween. For example, the first distance P1 may be shorter than the second distance P2. However, exemplary embodiments are not limited thereto. For example, the first distance P1 may be equal to or longer than the second distance P2.

In order for the light emitted from the light source 120 by the spacer 130 disposed between the two light sources 120 adjacent to each other in the first direction D1 to have a sufficient light path within the range of the light-emitting angle of the light source 120, the second distance P2 between the two light sources 120 having the spacer 130 therebetween may be greater than the first distance P1 between the two light sources 120 having no spacer 130 therebetween. For example, the ratio of the first distance P1 and the second distance P2 may be 1:1.3.

At least one spacer 130 may be disposed on the first substrate 110 where the light source 120 is not disposed. The spacers 130 may be spaced apart from each other along the first direction D1, e.g., in an extension direction of the first substrate 110. At least one light source 120 may be disposed between two spacers 130 spaced apart from each other. Although the drawings show that two light sources 120 are disposed between the two spacers 130 adjacent to each other in the first direction D1, exemplary embodiments are not limited thereto. For example, three or more light sources 120 may be disposed between two spacers 130 adjacent to each other in the first direction D1. Further, the number of light sources 120 disposed between the spacers 130 may be changed or varied in each area.

In an exemplary embodiment, the spacer 130 on the first substrate 110 may be spaced apart from the light source 120 in the first direction D1. The distance between the light sources 120 adjacent to each other in the first direction D1 from the spacer 130 may be equal to the distance between the light sources 120 adjacent to each other in the opposite direction of the first direction D1 from the spacer 130. For example, the spacer 130 may be disposed in the middle of positions where two light sources 120 adjacent to each other are disposed. The spacer 130 may be disposed in the middle of the positions where two light sources 120 adjacent to each other are disposed such that the luminance non-uniformity occurring in an area, in which the spacers 130 are disposed, is reduced, i.e., the luminance uniformity in the area, in which the spacers 130 are disposed, is improved.

The spacer 130 may be disposed between the first substrate 110 and the light guide plate 200. One surface of the spacer 130 may face the light incident surface 200S1 of the light guide plate 200, and the other surface of the spacer 130, which is an opposite surface of the one surface thereof, may be disposed on one surface of the first substrate 110. The one surface of the spacer 130 may be direct contact with the light incident surface 200S1 of the light guide plate 200.

The spacer 130 may be disposed between the first substrate 110 and the light guide plate 200 to support the light incident surface 200S1 of the light guide plate 200 in the second direction D2. Thus, the spacer 130 may support the light guide plate 200 with the middle mold 500. For example, when the second direction D2 is an opposite direction of gravity, the central portion of the first side surface 200S1 of the light guide plate 200 in which the middle mold 500 is not disposed may be sagged or bent by the load of the light guide plate 200. The spacer 130 may support at least a part of the first side surface 200S1 of the light guide plate 200, which is not supported by the middle mold 500 in the second direction D2 to prevent the first side surface 200S1 of the light guide plate 200 from being sagged or bent toward the light source 120. Further, referring to FIG. 4, the spacer 130 may support the light guide plate 200 with the middle mold 500 to prevent the light source 120 from being damaged by the movement of the light guide plate 200 toward the underlying light source 120.

In an exemplary embodiment, the spacer 130 may be a generally hexagonal column having a generally rectangular cross-section taken in the second direction D2. The cross-section of the spacer 130 taken in the second direction D2 may have a generally rectangular shape in which the length in the third direction D3 is longer than the length in the first direction D1. The length of the spacer 130 in the third direction D3 may be shorter than the length of the first substrate 110 in the third direction D3, and may be longer than the length of the light source 120 in the third direction D3. However, exemplary embodiments are not limited thereto, and the length of the spacer 130 in the third direction D3 may be equal to the length of the first substrate 110 in the third direction D3. When the length of the spacer 130 in the third direction D3 is equal to the length of the first substrate 110 in the third direction D3, the spacer 130 may stably support the light guide plate 200 in the second direction D2. However, exemplary embodiments are not limited thereto, and the cross-section of the spacer 130 taken in the second direction D2 may have a generally square shape in which the length in the first direction D1 is equal to the length in the third direction D3. One surface of the spacer 130 in the second direction D2 may be in direct contact with the light incident surface 200S1 of the light guide plate 200, and the other surface of the spacer 130 in a direction opposite to the second direction D2 may be disposed on one surface of the first substrate 110. Thus, the length (or height) of the spacer 130 in the second direction D2 may be substantially equal to the distance between the first substrate 110 and the light guide plate 200 in the second direction D2. The length (or height) of the spacer 130 in the second direction D2 may be greater than the length (or height) of the light source 120 in the second direction D2. The spacer 130 may maintain a substantially constant distance between the first substrate 110 and the light guide plate 200, thereby preventing the light guide plate 200 from being damaged by heat generated from the light source 120, and maintaining a sufficient incident area of light emitted from the light source 120.

Figure 6:
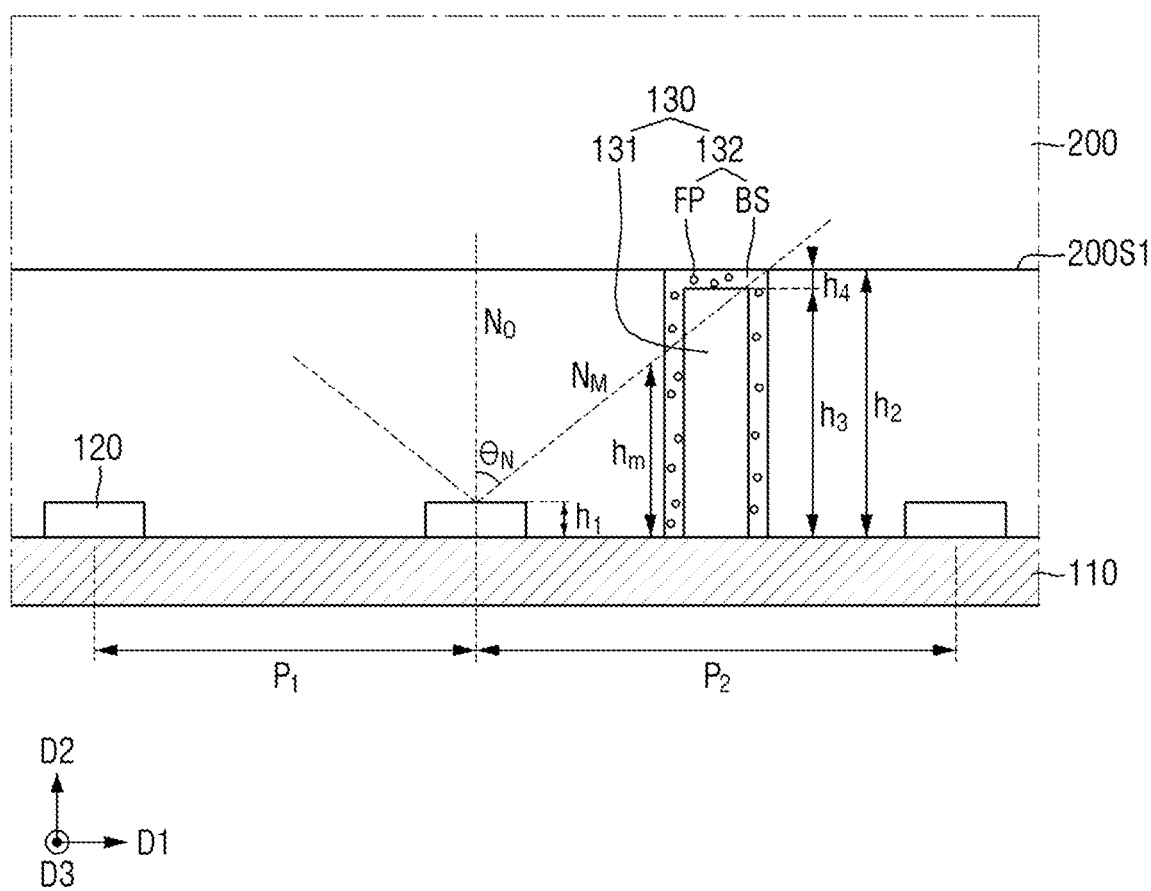
FIG. 6 is an enlarged cross-sectional view illustrating the light source member and the light guide plate of FIG. 1.
Figure 7:
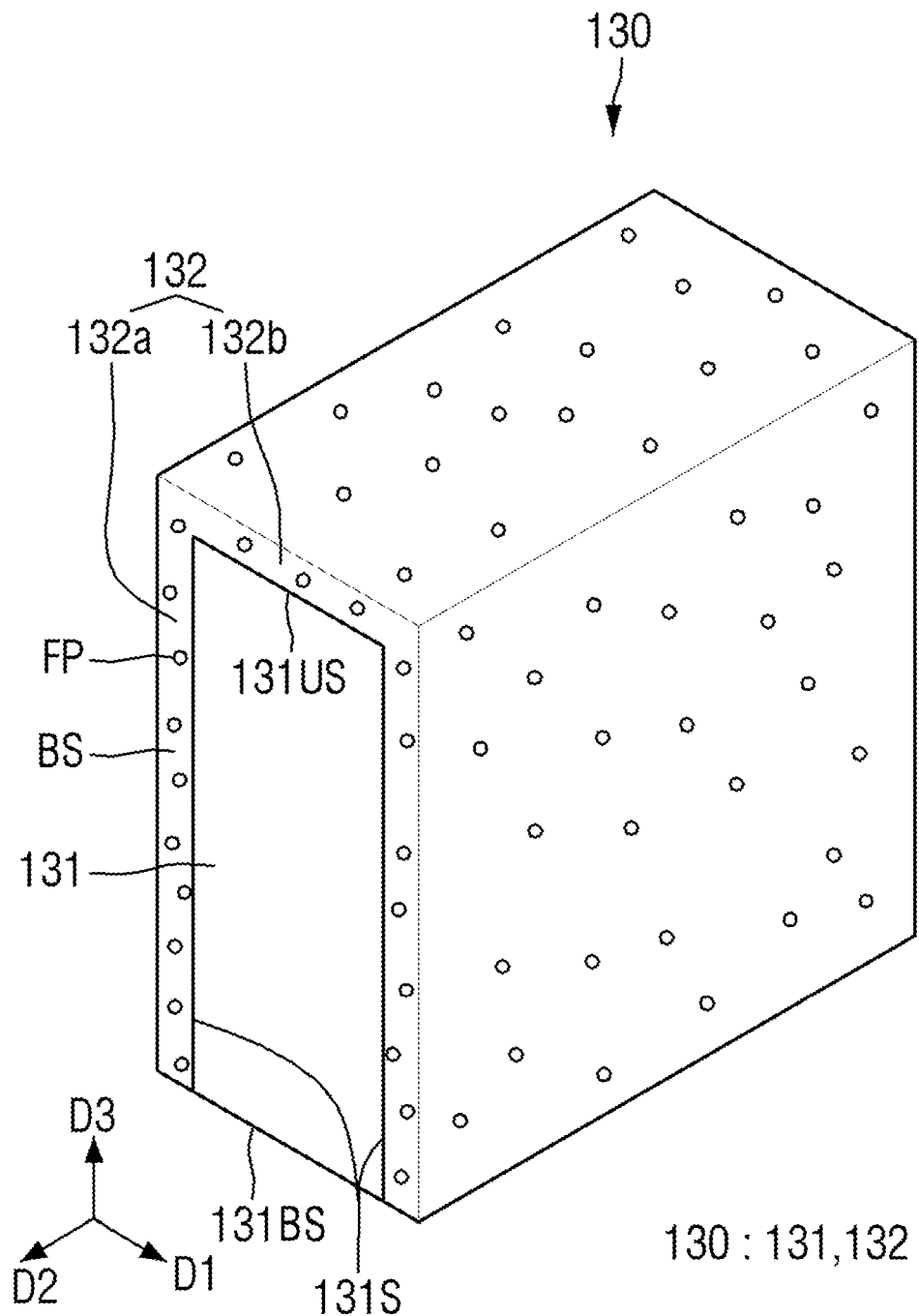
FIG. 7 is a perspective view of a spacer of the light source member of FIG. 6.

FIG. 6 is an enlarged cross-sectional view illustrating the light source member and the light guide plate of FIG. 1, and FIG. 7 is a perspective view of a spacer of the light source member of FIG. 1.

Referring to FIGS. 6 and 7, the spacer 130 may include a support 131 and a light regulating material layer 132 disposed on the support 131. As used herein, "light regulating material" means any substance or treatment that is capable of diffracting, diffusing, reflecting, scattering, converting and/or changing the wavelength of light.

The shape of the support 131 may be the substantially same as the shape of the spacer 130. For example, when the spacer 130 is a hexagonal column having a substantially rectangular cross-section taken in the second direction D2, the support 131 may also be a hexagonal column having a substantially rectangular cross-section taken in the second direction D2. Further, the cross-section of the support 131 may be a substantially rectangular shape in which the length in the third direction D1 is longer than the length in the first direction D1.

The support 131 may be disposed on one surface of the first substrate 110 where the light source 120 is not disposed. Although the drawings show that the support 131 is disposed on one surface of the first substrate 110, exemplary embodiments are not limited thereto. A separate adhesive member is disposed between the support 131 and the first substrate 110 to fix the support 131 onto the first substrate 110.

The support 131 may include glass fiber including epoxy resin. For example, the glass fiber including epoxy resin may be flame retardant (FR4) in which epoxy resin and glass fiber are laminated, or may be composite epoxy material (CEM3) in which a central portion thereof includes glass fiber that does not move.

Figure 8:
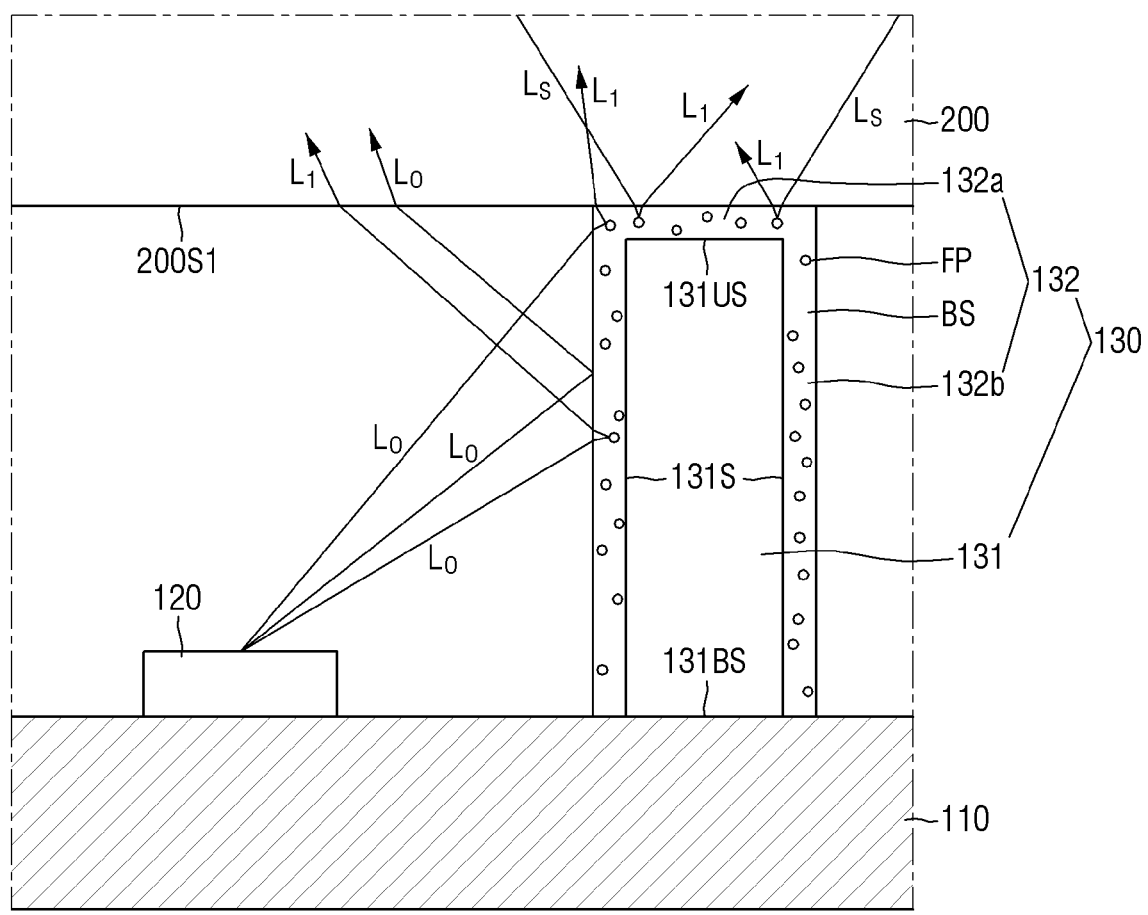
FIG. 8 is an enlarged cross-sectional view illustrating a traveling path of light emitted from the light source of FIG. 6.

Referring to FIG. 7, the support 131 may include a first surface 131US, a second surface 131S, and a third surface 131BS. The first surface 131US of the support 131 may be a surface disposed at one side of the support 131 in the second direction D2, and the third surface 131BS of the support 131 may be a surface disposed at the opposite side of one side of the support 131 in the second direction D2. Further, the second surface 131S of the support 31 may be a surface disposed at one side and the other side of the support 131 in the first direction D1. Referring to FIGS. 6-8, the first surface 131US may be the upper surface of the support 131, the second surface 131S may be the right and left surfaces of the support 131, and the third surface 131BS may be the lower surface of the support 131.

The third surface 131BS of the support 131 is placed on one surface of the first substrate 110. The first surface 131US of the support 131 faces the third surface 131BS of the support 131. Each of the first surface 131US of the support 131 and the third surface 131BS of the support 131 may be located in substantially one plane, and the plane on which the first surface 131US is located and the plane on which the third surface 131BS is located may be substantially parallel to have a substantially uniform thickness (or substantially uniform height).

The second surface 131S of the support 131 may face the light source 120 disposed adjacent to the support 131. In an exemplary embodiment, the plane on which the second surface 131S of the support 131 is located may form an angle of about 90° with respect to the plane on which the first surface 131US and/or the third surface 131BS of the support 131 is located. Thus, the plane on which one surface of the first substrate 110 is located and the plane on which the second surface 131S of the support 131 is located may form an angle of about 90°.

The length of the support 131 (or the height of the support 131, h2) in the second direction D2 may be longer than the length of the light source 120 (or the height of the light source 120, h1) in the second direction D2. When the length h2 of the support 131 in the second direction D2 is longer than the length h1 of the light source 120 in the second direction D2, the incident area of light emitted from the light source 120 and incident on the light guide plate 200 may be enlarged to prevent the condensation of light, thereby improving the uniformity of light.

The light regulating material layer 132 may be disposed on the first surface 131US and the second surface 131S of the support 131. The light regulating material layer 132 may be directly formed on the first surface 131US and the second surface 131S of the support 131, and thus the inner surface of the light regulating material layer 132 may be in contact with the first surface 131US and the second surface 131S of the support 131.

The light regulating material layer 132 may include a binder layer BS and wavelength conversion particles FP dispersed in the binder layer BS.

The binder layer BS is a medium in which the wavelength conversion particles FP are dispersed, and may include various resin compositions. The binder layer BS may have appropriate viscosity and hardness such that a portion of the light regulating material layer 132 contacting the light incident surface 200S1 of the light guide plate 200 is not damaged. For example, the binder layer BS may include silicon (Si). When the binder layer BS includes silicon, the thickness, viscosity, and hardness of the light regulating material layer 132 may be adjusted or modified according to the proportion of silicon. The viscosity and hardness of the light regulating material layer 132 including the binder layer BS may be appropriately adjusted or modified, thereby preventing the light regulating material layer 132 contacting the light incident surface 200S1 of the light guide plate 200 from being damaged by the load of the light guide plate 200.

The wavelength conversion particle FP is a particle that converts the wavelength of incident light, and may include, for example, a fluorescent material, a quantum dot (QD), or a phosphorescent material.

The fluorescent material may be a general organic phosphor or inorganic phosphor. In an exemplary embodiment, the fluorescent material may be a yellow phosphor. The yellow phosphor may be a YAG-based fluorescent material, a silicate-based fluorescent material, an oxynitride-based fluorescent material, or a combination thereof, but exemplary embodiments are not limited thereto.

A quantum dot, which is a material having a crystal structure of several nanometers in size, may be composed of hundreds to thousands of atoms, and may exhibit a quantum confinement effect in which an energy band gap increases, due to its small size. When light having a wavelength of higher energy than the band gap is incident on the quantum dot (QD), the quantum dot (QD) may absorb the light to become an excited state, and may emit light of a specific wavelength to fall to a ground state. The emitted light of the wavelength has a value corresponding to the band gap. When the size and composition of the quantum dot (QD) are adjusted or modified, the light emission characteristics due to the quantum confinement effect may be adjusted or modified.

The quantum dot (QD) may include at least one of a II-VI compound, a II-V compound, a III-VI compound, a III-V compound, a IV-VI compound, a compound, a II-IV-VI compound, and a II-IV-V compound.

The quantum dot may include a core and a shell overcoating the core.

The core may include at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, Fe2O3, Fe3O4, Si, and Ge, but exemplary embodiments are not limited thereto. The shell may include at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, and PbTe, but exemplary embodiments are not limited thereto.

Hereinafter, a case in which the wavelength conversion particle (FP) includes a yellow phosphor as a fluorescent material will be described as below. Further, when the wavelength conversion particles FP are different types of particles, the following description may be applied in the similar way.

In an exemplary embodiment, the light regulating material layer 132 may completely cover the first surface 131US and the second surface 131S of the support 131. The light regulating material layer 132 may include a first region 131a disposed on the first surface 131US of the support 131 and a second region 131b disposed on the second surface 131S of the support 131. The first region 131a and the second region 131b may be different from each other in arrangement, and the materials and ratios of the light regulating material layer 132 may be the substantially same. Further, the first region 131a and the second region 131b may be disposed on the first surface 131US and the second surface 131S of the support 131, and may be integrated with each other.

The light regulating material layer 132 may have a substantially uniform thickness (h4) as a whole. For example, the thickness h4 of the light regulating material layer 132 may be defined as a distance from the inner surface of the light regulating material layer 132 disposed on the first surface 131US and the second surface 131S of the support 131 to the outer surface of the light regulating material layer 132 in the second direction D2.

The length h2 of the spacer 130 in the second direction D2 may be equal to the sum of the length h3 of the support 131 in the second direction D2 and the thickness h4 of the light regulating material layer 132.

The outer surface of the light regulating material layer 132 may form the outer surface of the spacer 130.

The light regulating material layer 132 may prevent or reduce a dark portion that may occur in an area where the spacer 130 is disposed. For example, the light regulating material layer 132 including phosphor may diffuse light incident on one surface of the spacer 130 of the light incident on the light guide plate 200 toward the light guide plate 200 again such that the luminance of the area where the spacer 130 is disposed and the area where the light source 120 is disposed is uniform. Details of a path through which light emitted from the light source 120 travels toward the light guide plate 200 and/or a path through which light travels from the light guide plate 200 toward one surface of the spacer 130 will be described later with reference to FIG. 8.

In order to improve the luminance uniformity of light emitted from the light source 120 and incident on the light guide plate 200 and to prevent the light guide plate 200 from being damaged by heat generated from the light source 120, the appropriate positional and height relationship between the light source 120 and the spacer 130 may be set. Hereinafter, the relationship between the light source 120 and the spacer 130 for optimizing luminance uniformity by minimizing damage to the light guide plate 200 and preventing or reducing dark portions that may occur in the area disposed in the spacer 130 will be described with reference to FIG. 8.

In an exemplary embodiment, the light source 120 may emit light from the center of one surface of the light source 120 that faces the light incident surface 200S1 of the light guide plate 200. The light emitted by the light source 120 may generally travel from one surface of the light source 120 toward the second direction D2. A portion of the light emitted by the light source 120 may travel toward the second direction D2 at a predetermined angle from the plane on which one surface of the light source 120 is located. The light emitted from the light source 120 may have a light path within the range of a light-emitting angle of the light source 120. In an exemplary embodiment, the directivity angle of the light source 120 may be about 120°.

Referring to FIG. 6, when the reference line $N_0$ passing through the center of the light source 120 in the second direction D2 is defined, the traveling path of the light emitted from the light source 120 may form a first angle $\theta_N$ of an acute angle with the reference line $N_0$. In an exemplary embodiment, the first angle $\theta_N$ formed by the traveling path of the light emitted from the light source 120 and the reference line $N_0$ may be about 60° or less. For example, the maximum value of the first angle $\theta_N$ formed by the traveling path of the light emitted from the light source 120 and the reference line $N_0$ may be about 60°.

When the traveling path of light is defined as a reference path line $N_M$ in the case where the first angle $\theta_N$ formed by the traveling path of the light emitted from the light source 120 and the reference line $N_0$ is maximum, the light emitted from the light source 120 may generally travel between the reference line $N_0$ and the reference path line $N_M$. The reference path line $N_M$ having the maximum angle from the reference line $N_0$ may pass through the left side surface of the spacer 130 (refer to FIG. 6) and/or the second surface 131S of the support 131.

In order to prevent the light guide plate 200 from being damaged by heat generated from the light source 120, the length h2 of the spacer 130 in the second direction D2 may be a sufficient long length. The length h2 of the spacer 130 in the second direction D2 may be greater than a reference height hm from one surface of the first substrate 110 to a point where the left side surface of the spacer 130 meets the reference path line $N_M$. The length h2 of the spacer 130 in the second direction D2 may be greater than the reference height hm, thereby effectively preventing the light guide plate 200 from being damaged by heat generated from the light source 120.

As described above, in order to sufficiently secure or retain an incident area in which light emitted from the light source 120 is incident on the light guide plate 200 and to prevent the damage of the light guide plate 200, the distance between the light source 120 and the light guide plate 200 in the second direction D2 may be determined by the length h3 of the support 131 in the second direction D2. Further, in order to prevent the wavelength conversion particles FP included in the first region 131a of the light regulating material layer 132 from being damaged and stripped by the load of the light guide plate 200, the light regulating material layer 132 may have a sufficient thickness h4. However, exemplary embodiments are not limited thereto. For example, the length h3 of the support 131 in the second direction D2 may range from 0.8 mm to 1 mm, and the thickness h4 of the light regulating material layer 132 may range from 30 μm to 50 μm.

FIG. 8 is an enlarged cross-sectional view illustrating a traveling path of light emitted from the light source of FIG. 6.

Referring to FIG. 8, the incidence angle of light emitted from the light source 120 and incident onto the light incident surface 200S1 of the light guide plate 200 may be about 0° to about 60°. The light $L_0$ emitted from the light source 120 may generally travel into the light guide plate 200 through the light incident surface 200S1 of the light guide plate 200. A portion of the light $L_0$ emitted from the light source 120 may travel toward the second region 132b of the light regulating material layer 132 of the spacer 130.

A portion of the light $L_0$ traveling toward the second region 132b of the light regulating material layer 132 may be reflected from the outer surface of the light regulating material layer 132 or diffused by the binder layer BS to be incident onto the light incident surface 200S1 of the light guide plate 200. Another portion of the light $L_0$ traveling toward the second region 132b of the light regulating material layer 132 may be transmitted to the binder layer BS and be incident on the wavelength conversion particles FP dispersed in the binder layer BS. The light $L_0$ having a first wavelength band emitted from the light source 120 may be converted into light $L_1$ having a second wavelength band different from the first wavelength band, and the light $L_1$ may be emitted. The emitted light $L_1$ may be incident onto the light incident surface 200S1 of the light guide plate 200. For example, the blue light emitted from the light source 120 may be converted into light of a yellow wavelength band by the wavelength conversion particles FP and be incident onto the light guide plate 200 as yellow light.

For example, since the length h2 of the spacer 130 in the second direction D2 is longer than the reference height hm, a portion of the light emitted from the light source 120 that travels toward the spacer 130 within the light-emitting angle, may not be incident on the light incident surface 200S1 of the light guide plate 200 overlapping the spacer 130. Accordingly, a dark portion may occur in an area overlapping the spacer 130 in the second direction D2. The first region 132a of the light regulating material layer 132 may prevent or reduce the dark portion from being generated by the spacer 130.

Specifically, the light $L_O$ emitted from the light source 120 and incident on the light guide plate 200 may be totally reflected by the light guide plate 200 to travel inside the light guide plate 200. A portion of the light $L_S$ traveling inside the light guide plate 200 may travel toward the first region 132a of the light regulating material layer 132. A portion of the light incident onto the first region 132a of the light regulating material layer 132 inside the light guide plate 200 may pass through the binder layer BS and be incident onto the wavelength conversion particles FP included in the first region 132a of the light regulating material layer 132. The light $L_S$ incident from the light guide plate 200 to the first region 132a of the light regulating material layer 132 may be converted into light $L_1$ of the second wavelength band by the wavelength conversion particles FP, and the light $L_1$ may be emitted toward the light guide plate 200. Thus, the light may be diffused by the first region 132a of the light regulating material layer 132. As a result, the light $L_S$ or $L_O$ may be emitted in the area overlapping the spacer 130, thereby preventing or reducing the dark portion that may occur by the spacer 130.

In the illustrated exemplary embodiment, when the light regulating material layer 132 is disposed on the first surface 131US of the support 131, the light traveling from the light guide plate 200 toward the first region 131a of the light regulating material layer 132 is diffused back toward the light guide plate 200 thereby preventing or reducing the dark portion that may occur in an area where the support 131 is disposed For example, the first region 131a of the light regulating material layer 132 may prevent or reduce the dark portion generated by the support 131 in the area overlapping the support 131. Thus, the luminance uniformity of the display device 1 may be improved. Further, the light regulating material layer 132 may be disposed on the second surface 131S of the support 131, and thus light of the second wavelength band different from the light of the first wavelength band emitted from the light source 120 may be emitted even in the area where the first region 131a of the light regulating material layer 132 is not disposed. For example, the second region 131b of the light regulating material layer 132 may prevent or reduce the color difference between an area overlapping the first region 131a of the light regulating material layer 132 and an area not overlapping the first region 131a of the light regulating material layer 132.

In the drawing, only the case where the light $L_O$ emitted from the light source 120 generally travels between the reference line $N_O$ and the reference path line $N_M$, the traveling direction of the light emitted from the light source 120 is not limited thereto, and at least a portion of the light emitted from the light source 120 may travel in a direction other than between the reference line $N_O$ and the reference path line $N_M$, for example, toward an outside direction of the reference path line $N_M$.

Figure 9:
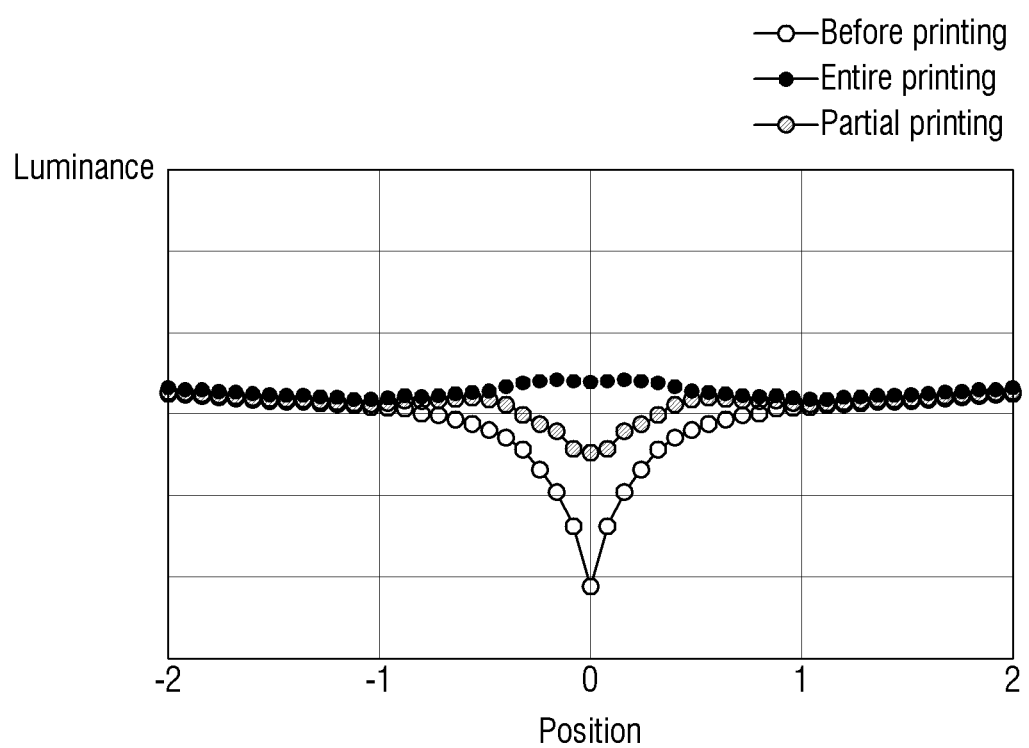
FIG. 9 is a graph illustrating measuring luminance according to positions defined based on the position of the spacer as a reference position.

FIG. 9 is a graph illustrating measuring luminance according to positions defined based on the position of the spacer as a reference point.

In the graph of FIG. 9, X-axis indicates a relative position of the measured point in the first direction D1 when the position of the spacer 130 is taken as a reference point in an area corresponding to the area Q in FIG. 5, and Y-axis indicates luminance. In FIG. 9, the area where the spacer 130 is disposed in the Q area is set as a reference point '0', the position of the light source 120 disposed in the first direction D1 is set as '2', and the position of the light source 120 disposed in a direction opposite to the first direction D1 is set as '−2'.

Referring to FIG. 9, in the graph of FIG. 9, the 'before printing' graph in the graph of FIG. 9 is a graph measuring the luminance at each position when the light regulating material layer 132 is not disposed on the first surface 131US and the second surface 131S of the support 131. Further, the 'partial printing' graph in the graph of FIG. 9 is a graph measuring the luminance at each position when the light regulating material layer 132 is disposed on only the second surface 131S of the support 131. Further, the 'entire printing' graph in the graph of FIG. 9 is a graph measuring the luminance at each position when the light regulating material layer 132 is disposed on both the first surface 131US and the second surface 131S of the support 131.

When the light regulating material layer 132 is not disposed on the first surface 131US and the second surface 131S of the support 131 (the 'before printing' graph in the graph of FIG. 9), the luminance of the area where the support 131 is disposed has a smaller value than the luminance of the area where the support 131 is not disposed.

When the light regulating material layer 132 is disposed on only the second surface 131S of the support 131 (the 'partial printing' graph in the graph of FIG. 9), the luminance of the area where the support 131 is disposed is increased as compared with the luminance shown in the 'before printing' graph. Thus, in this case, the difference between the luminance of the area where the supporter 131 is disposed and the luminance of the area where the supporter 131 is not disposed is reduced as compared with the 'before printing' graph.

When the light regulating material layer 132 is disposed on both the first surface 131US and the second surface 131S of the support 131 (the 'entire printing' graph in the graph of FIG. 9), the luminance of the area where the support 131 is disposed is similar to the luminance of the area where the support 131 is not disposed. Further, in this case, the luminance of the area where the support 131 is disposed may be greater than the luminance of the area where the support 131 is not disposed.

In the illustrated exemplary embodiment, when the light regulating material layer 132 is disposed (or applied) not only on the second surface 131S of the support 131 facing the light source 120 but also on the first surface 131US of the support 131 facing the light incident surface 200S1 of the light guide plate 200, a dark portion of the area where the spacer 130 is disposed may be prevented or reduced, thereby improving the luminance uniformity of the display device 1, compared to when the light regulating material layer 132 is disposed only on the second surface 131S of the support 131.

Hereinafter, other exemplary embodiments of the spacer 130 of the light source member 100 will be described. In the following exemplary embodiments, the same components as those already described will be omitted or simplified, and the differences will be mainly described to avoid redundancy.

FIG. 10 is an enlarged cross-sectional view illustrating another exemplary embodiment of the spacer of the light source member of FIG. 6.

The exemplary embodiment of FIG. 10 is different from the exemplary embodiment of FIG. 6 in that the plane where the second surface 132S of the support 131_1 is located and the plane where the first surface 132US of the support 131_1 is located are inclined at a predetermined angle other than 90°.

Specifically, the cross-section of the support 131_1 may be a generally trapezoidal shape. In the support 131_1 according to the illustrated exemplary embodiment, the width of the first surface 131US in the first direction D1 may be smaller than the width of the third surface 131BS in the first direction D1. Accordingly, the second surface 131S of the support 131_1 may be inclined toward the third surface 131BS of the support 131_1 with a predetermined angle.

In the illustrated exemplary embodiment, since the second surface 131S of the support 131_1 is inclined toward the third surface 131BS of the support 131_1, the incidence angle of light, which is emitted from the light source 120 and travels to the side surface of the spacer 130_1, may be greater than the incidence angle of light traveling to the side surface of the spacer 130 when the side surface of the spacer 130 and one surface of the first substrate 110 are vertical as the exemplary embodiment of FIG. 6. Thus, the incident area of light, which is incident on the side surface of the spacer 130 and travels toward the light guide plate 200, may be widened or extended. Therefore, the area where light is incident on the light incident surface 200S1 of the light guide plate 200 is widened or extended thereby preventing the light emitted from the light source 120 from being condensed only in the narrow area. As a result, the display device 1 may efficiently exhibit substantially uniform luminance across the entire light display area.

Figure 11:
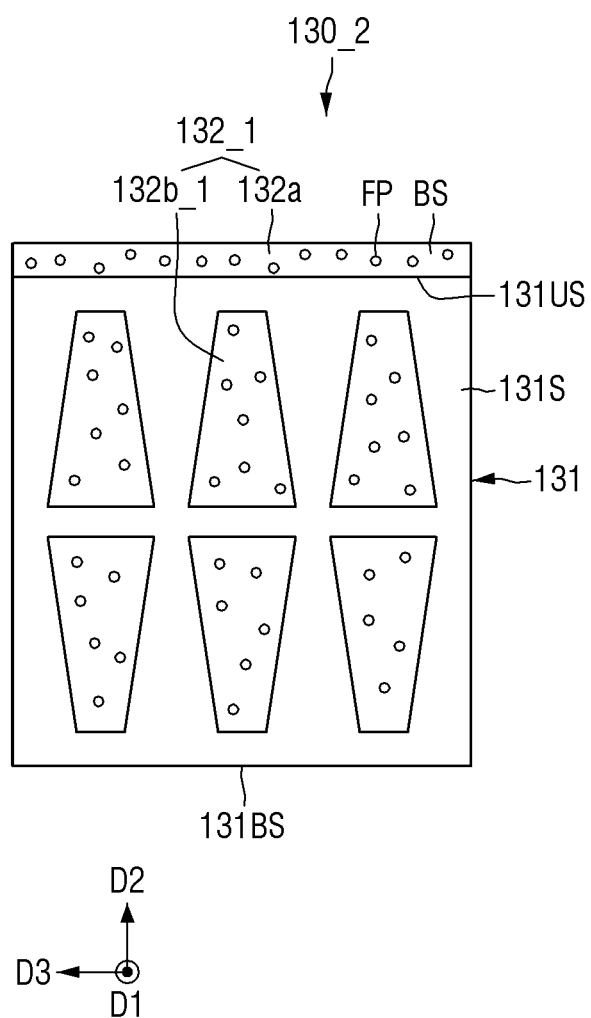
FIG. 11 is a side view of another exemplary embodiment of the spacer of the light source member of FIG. 6.

FIG. 11 is a side view of another exemplary embodiment of the spacer of the light source member of FIG. 6, and FIG. 12 is an enlarged cross-sectional view illustrating the spacer of the light source member of FIG. 11.

Referring to FIGS. 11 and 12, the illustrated exemplary embodiment is different from the embodiment of FIG. 6 in that the second region 132b_1 of the light regulating material layer 132_1 disposed on the second surface 131S of the support 131 is patterned.

Specifically, the second region 132b_1 of the light regulating material layer 132_1 may be patterned to form a plurality of patterned second regions 132b_1 disposed on the second surface 131S of the support 131. The patterned second regions 132b_1 of the light regulating material layer 132_1 may be separated from each other. Each of the patterned second regions 132b_1 of the light regulating material layer 132_1 may have a generally trapezoidal shape when viewed from the first direction D1, i.e., in a plan view (based on the first direction D1). The areas of the respective patterned second regions 132b_1 of the light regulating material layer 132_1 may be the same as each other. However, exemplary embodiments are not limited to thereto. For example, the areas of the respective patterned second regions 132b_1 of the light regulating material layer 132_1 may be different from each other.

As shown in FIG. 11, the width of each patterned second region 132b_1 of the light regulating material layer 132_1 may decrease in outward directions from the center of the second surface 131S toward the first surface 131US and the third surface 131B S. However, exemplary embodiments are not limited thereto. For example, the width of the patterned second region 132b_1 of the light regulating material layer 132_1 may increased in outward directions from the center of the second surface 131S toward the first surface 131US and the third surface 131BS For example, the area of the patterned light regulating material layer 132_1 may have a range of 5% or more and 90% or less of the area of the second surface 131S of the support 131. However, exemplary embodiments are not limited thereto.

Figure 13:
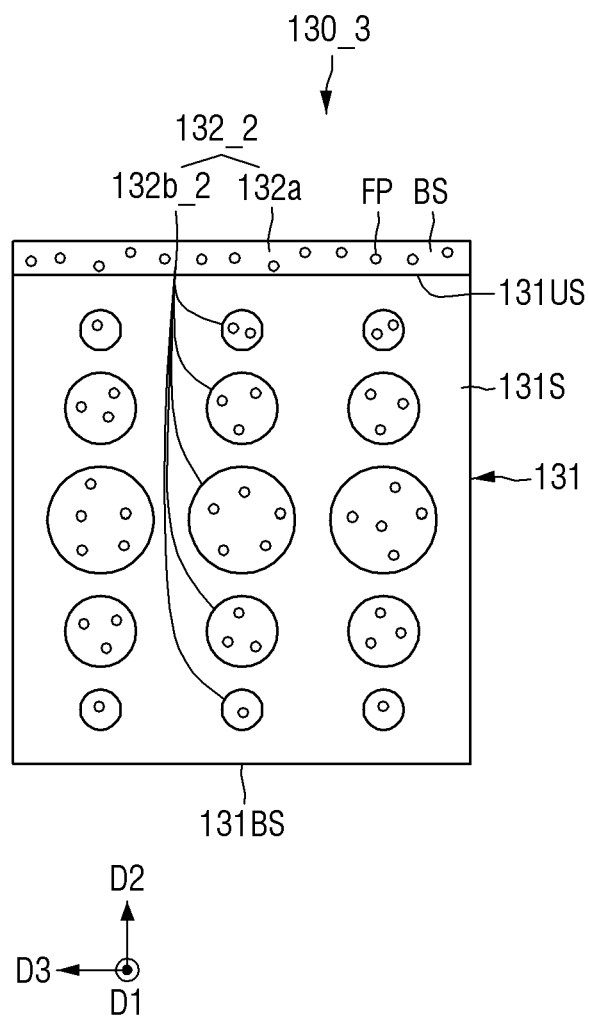
FIG. 13 is a side view of another exemplary embodiment of the spacer of the light source member of FIG. 6.
Figure 15:
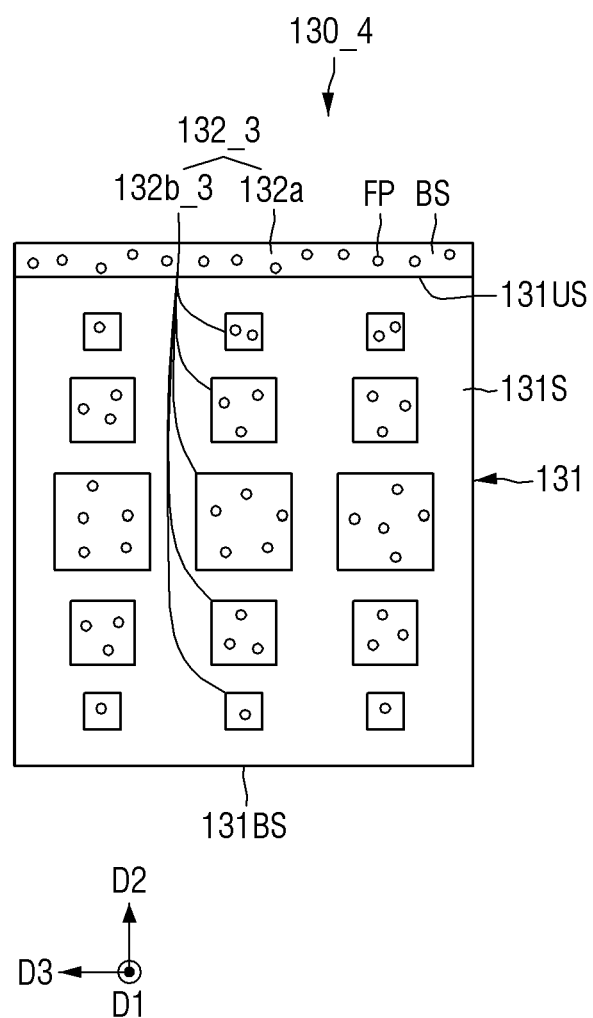
FIG. 15 is a side view of another exemplary embodiment of the spacer of the light source member of FIG. 6.

FIG. 13 is a side view of another exemplary embodiment of the spacer of the light source member of FIG. 6, FIG. 14 is an enlarged cross-sectional view illustrating the spacer of FIG. 13, and FIG. 15 is a side view of another exemplary embodiment of the spacer of FIG. 6.

Referring to FIG. 13, the illustrated exemplary embodiment is different from the embodiment of FIG. 6 in that the second region 132b_2 of the light regulating material layer 132_2 disposed on the second surface 131S of the support 131 is patterned into different shapes.

Specifically, the second region 132b_2 of the light regulating material layer 132_2 may be patterned to form a plurality of patterned second regions 132b_2 disposed on the second surface 131S of the support 131. The patterned second regions 132b_2 of the light regulating material layer 132_2 may be separated from each other. Each patterned second region 132b_2 of the light regulating material layer 132_2 may have a generally circular shape when viewed from the first direction D1, i.e., in a plan view (based on the first direction D1). The planar shapes of the respective patterned second regions 132b_2 of the light regulating material layer 132_2 may resemble circles having different areas from each other.

As shown in FIGS. 13 and 14, the area of the patterned second regions 132b_2 of the light regulating material layer 132_2 may decrease in outward directions from the center of the second surface 131S toward the first surface 131US and the third surface 131BS.

For example, the area of the patterned light regulating material layer 132_2 may have a range of 5% or more and 90% or less of the area of the second surface 131S of the support 131. However, exemplary embodiments are not limited thereto.

Referring to FIG. 15, the illustrated exemplary embodiment is different from the exemplary embodiment of FIG. 13 in that the second region 132b_3 of the light regulating material layer 132_3 disposed on the second surface 131S of the support 131 is patterned to form a plurality of patterned second regions 132b_3 in a generally rectangular shape.

In the illustrated exemplary embodiment, each patterned second regions 132b_3 of the light regulating material layer 132_3 may have a generally rectangular shape when viewed from the first direction D1, i.e., in a plan view (based on the first direction D1). The planar shapes of the respective patterned second regions 132b_3 of the light regulating material layer 132_3 may resemble rectangles having different areas from each other.

Figure 16:
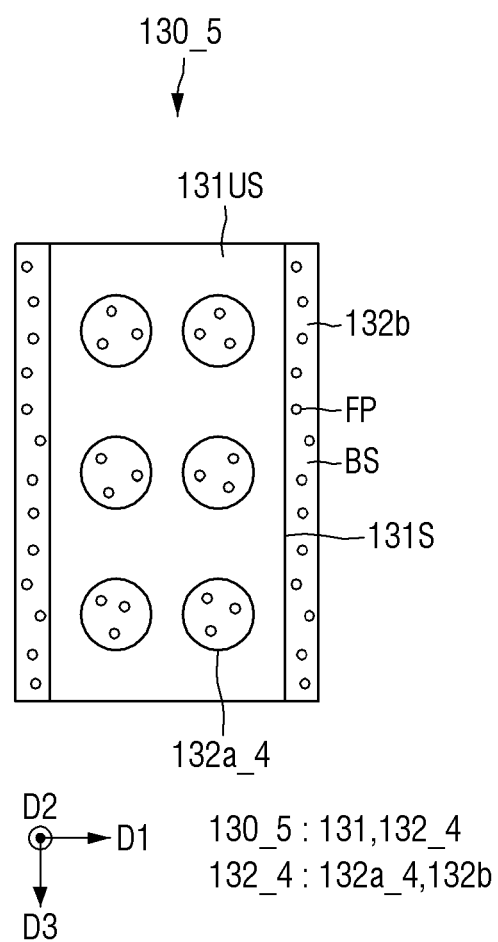
FIG. 16 is a plan view of another exemplary embodiment of the spacer of the light source member of FIG. 6.
Figure 17:
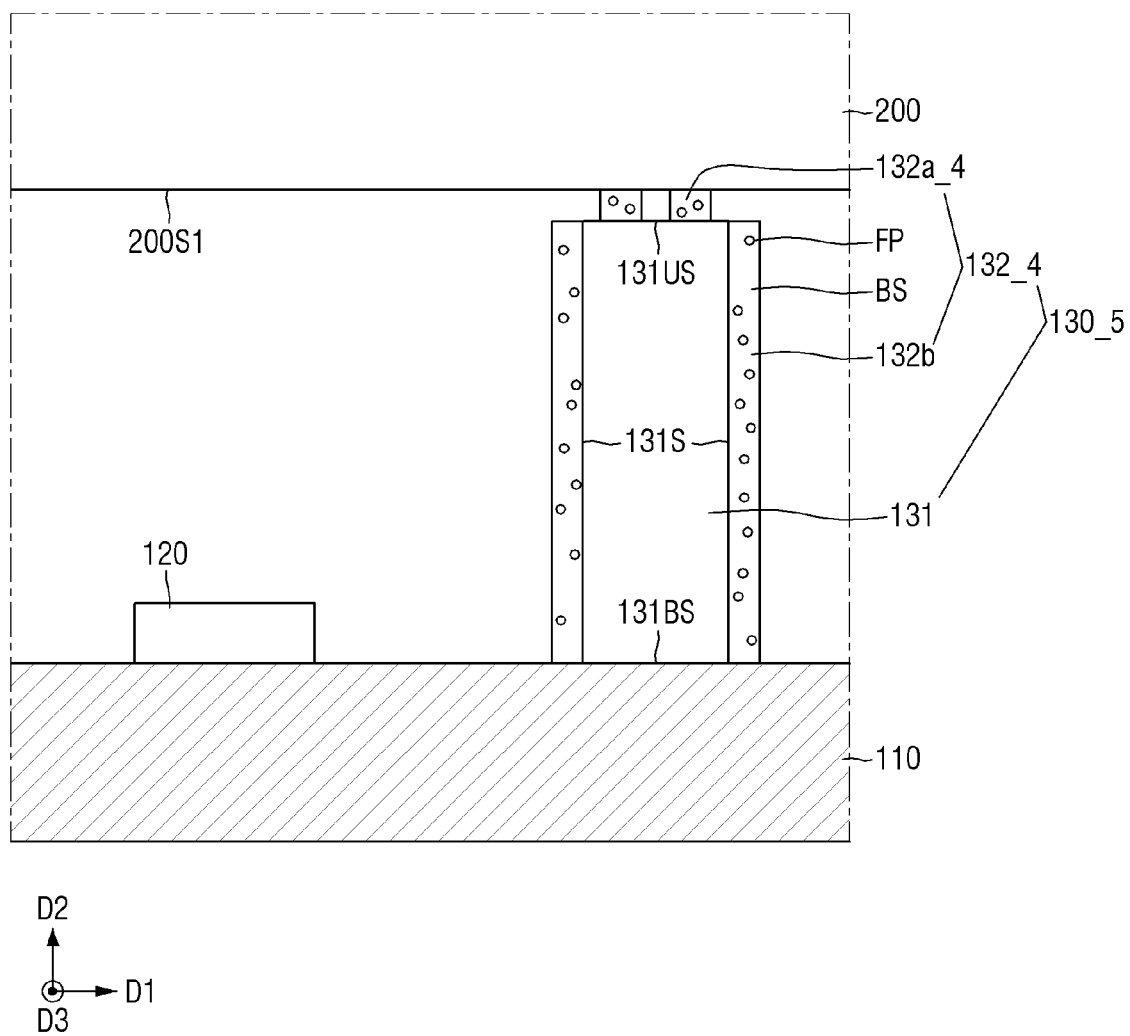
FIG. 17 is an enlarged cross-sectional view illustrating the spacer of FIG. 16.

FIG. 16 is a plan view of another exemplary embodiment of the spacer of the light source member of FIG. 6, and FIG. 17 is an enlarged cross-sectional view illustrating the spacer of FIG. 16.

Referring to FIGS. 16 and 17, the illustrated exemplary embodiment is different from the embodiment of FIG. 6 in that the first region 132a_4 of the light regulating material layer 132_4 disposed on the second surface 131S of the support 131 is patterned.

Specifically, the first region 132a_4 of the light regulating material layer 132_4 may be patterned to form a plurality of patterned first regions 132a_4 disposed on the second surface 131S of the support 131. The patterned first regions 132a_4 of the light regulating material layer 132_4 may be separated from each other. The patterned first regions 132a_4 of the light regulating material layer 132_4 may have a generally circular shape when viewed from the second direction D2, i.e., in a plan view (based on the second direction D2). The areas of the respective patterned second regions 132a_4 of the light regulating material layer 132_4 may be substantially equal to each other.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A backlight unit for a display device, the backlight unit comprising:
   a light guide including a light incident surface;
   a substrate facing the light incident surface;
   a plurality of light sources on one surface of the substrate facing the light incident surface; and
   a first member disposed between the substrate and the light incident surface to space the light sources apart from the light guide,
   wherein the first member includes:
   a support on one surface of the substrate that do not include the light source, the support having a first surface facing the light incident surface and a second surface facing the light sources; and
   a first layer disposed on one surface of the substrate that does not include the light source and disposed on the first surface and the second surface of the support to improve luminance uniformity across the light incident surface.

2. The backlight unit of claim 1, wherein the first member comprises a spacer having a height greater than a height of the light sources.

3. The backlight unit of claim 2, wherein the height of the spacer is substantially equal to a sum of a height of the support and a thickness of the first layer, and the height of the support is greater than the height of the light sources and the thickness of the first layer.

4. The backlight unit of claim 1, wherein the support has a third surface attached to the substrate, and the support has no surfaces other than the first, second and third surfaces, and
   wherein the first layer covers all of the first and second surfaces of the support and does not cover any of the third surface of the support.

5. The backlight unit of claim 1, wherein each of the light sources is configured to emit light having a first wavelength band,
   the first layer comprises a light regulating material layer including a binder layer and wavelength conversion particles disposed in the binder layer, and
   the wavelength conversion particles are configured to convert the light having the first wavelength band into light having a second wavelength band different from the first wavelength band.

6. The backlight unit of claim 5, wherein the support has a rectangular shape and is in contact with both the substrate and the light incident surface.

7. The backlight unit of claim 1, wherein the first layer is not in contact with any of the plurality of light sources.

8. The backlight unit of claim 1, wherein the first member is disposed directly between adjacently positioned first and second light sources of the plurality of light sources on the substrate such that the first light source and the second light source of the plurality of light sources are separated from each other by a distance R that is greater than a distance T that the second light source is separated from an adjacently positioned third light source of the plurality of light sources disposed on the substrate.

9. The backlight unit of claim 1, wherein the first layer includes a first region disposed on the first surface of the support and a second region disposed on the second surface of the support.

10. The backlight unit of claim 9, wherein the first region completely covers the first surface of the support.

11. The backlight unit of claim 10, wherein the second region is patterned to form a plurality of patterned second regions disposed on the second surface of the support.

12. The backlight unit of claim 11, wherein each patterned second region has width that decreases in a direction toward the light incident surface.

13. The backlight unit of claim 10, wherein the second region substantially completely covers the second surface of the support.

14. The backlight unit of claim 9, wherein the first region is patterned and disposed on the first surface of the support.

15. The backlight unit of claim 9, wherein the light guide comprises a light guide plate and the second region is in contact with the light incident surface of the light guide plate.

16. The backlight unit of claim 1, wherein:
   the plurality of light sources are spaced apart from each other, and
   the first member and the light sources adjacent thereto are spaced apart from each other.

17. A display device comprising:
   a backlight unit including a light guide having a light incident surface, a substrate facing the light incident surface, a plurality of light sources on one surface of the substrate facing the light incident surface to emit light, and a first member disposed between the substrate and the light incident surface to space the light sources apart from the light guide; and
   a display panel disposed on the backlight unit,
   wherein the first member includes:
   a support disposed on one surface of the substrate that does not contain the light sources, the support having a first surface facing the light incident surface and a second surface facing the light sources; and
   a first layer disposed on one surface of the substrate that does not include the light source and disposed on the first surface and second surface of the support to improve luminance uniformity across the light incident surface.

18. The display device of claim 17, wherein the first layer includes a first region disposed on the first surface of the support and a second region disposed on the second surface of the support.

19. The display device of claim 18, wherein the second region of the first layer is in contact with the light incident surface of the light guide.

20. The display device of claim 17, wherein:
   the light is blue light, and
   the first layer comprises a light regulating material layer having a binder layer and wavelength conversion particles dispersed in the binder layer, and the wavelength conversion particles include a fluorescent material to convert the blue light into yellow light.

* * * * *